(12) United States Patent
Mao et al.

(10) Patent No.: US 10,191,272 B2
(45) Date of Patent: Jan. 29, 2019

(54) ELECTROWETTING ASSEMBLY TECHNIQUE AND CELL STRUCTURE

(71) Applicant: ABL IP HOLDING LLC, Conyers, GA (US)

(72) Inventors: An Mao, Jersey City, NJ (US); Gregory Malone, Herndon, VA (US); Robert M. Krass, Ashburn, VA (US); Youssef F. Baker, Arlington, VA (US); Rashmi Kumar Raj, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 113 days.

(21) Appl. No.: 15/479,857

(22) Filed: Apr. 5, 2017

(65) Prior Publication Data

US 2018/0292642 A1  Oct. 11, 2018

(51) Int. Cl.
 *G02B 26/00* (2006.01)

(52) U.S. Cl.
 CPC ......... *G02B 26/005* (2013.01); *G02B 26/001* (2013.01)

(58) Field of Classification Search
 None
 See application file for complete search history.

(56) References Cited

U.S. PATENT DOCUMENTS

| | | |
|---|---|---|
| 2010/0046084 A1 | 2/2010 | Kirita et al. |
| 2013/0208370 A1 | 8/2013 | Kim et al. |
| 2014/0185126 A1 | 7/2014 | Liang et al. |
| 2017/0018214 A1 | 1/2017 | Black et al. |
| 2017/0045203 A1 | 2/2017 | Mao et al. |

OTHER PUBLICATIONS

Heikenfeld et al., "Recent Progress in Arrayed Electrowetting Optics", OPN, 2009, 7 pages.
U.S. Appl. No. 15/228,414, filed Aug. 4, 2016, entitled "Configurable Optical Transducers Using an Optical Modulator and One or More Lenses".
U.S. Appl. No. 15/389,829, filed Dec. 23, 2016, entitled "Electrowetting Cellular Array and Luminaire Incorporating the Array".
International Search Report and Written Opinion of the International Searching Authority for International Application No. PCT/US18/24447, dated Jun. 8, 2018 (9 pages).

*Primary Examiner* — Darryl J Collins
*Assistant Examiner* — Journey Sumlar
(74) *Attorney, Agent, or Firm* — RatnerPrestia

(57) ABSTRACT

The examples herein relate to assembly techniques and structures for an electrowetting cell, e.g. a fluid lens, a fluid prism or a single cell that may support both variable lens and variable prism functions. The resulting cell structure, for example, may support both beam shaping and steering functions, e.g. supporting use of the same electrowetting cell structure for a wider variety of optical processing applications. The resulting cell may be used in combination with an optical/electrical transducer or an array of cells may be used with a transducer in systems for a various light input and/or output applications.

18 Claims, 24 Drawing Sheets

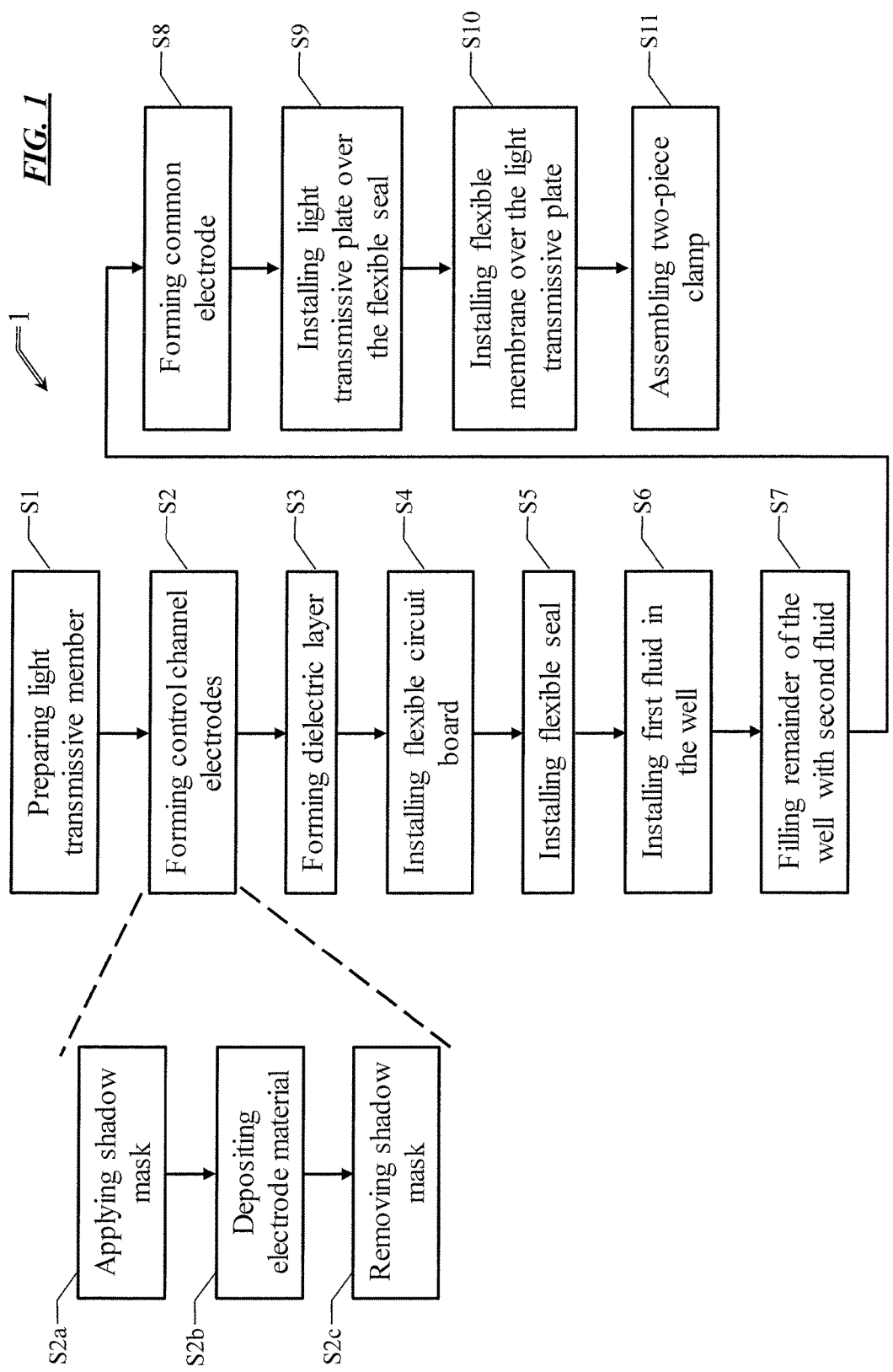

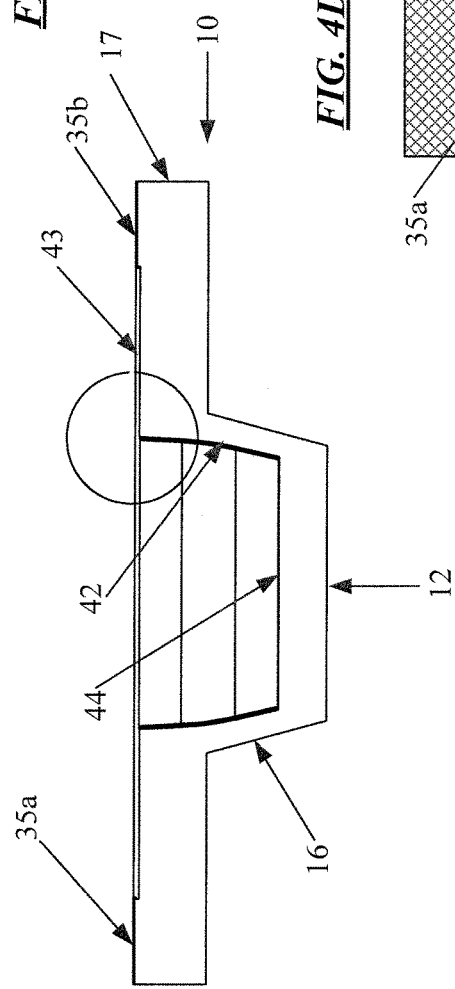
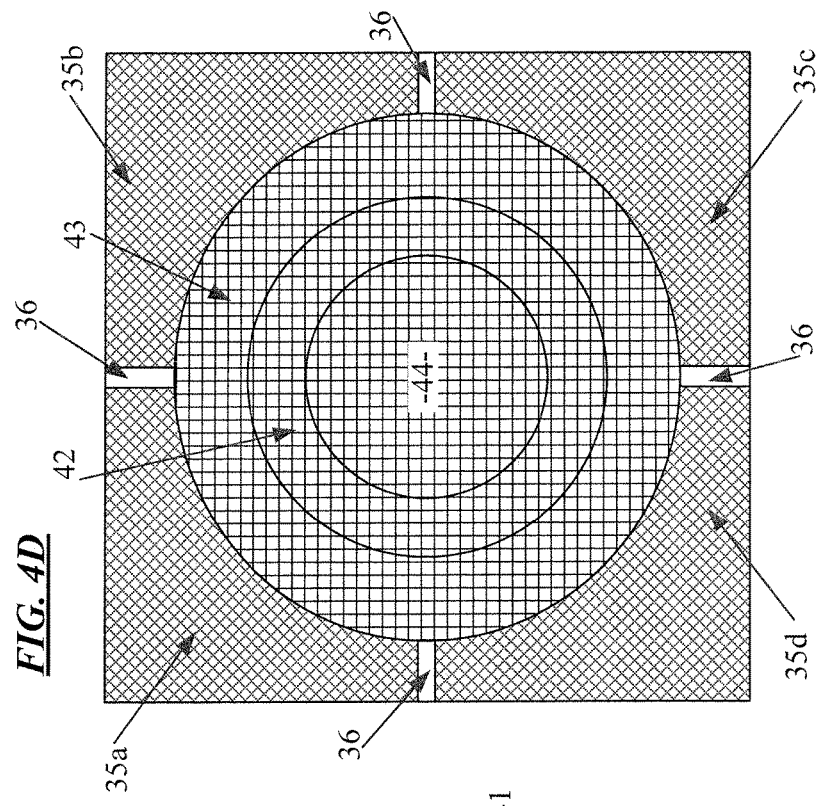
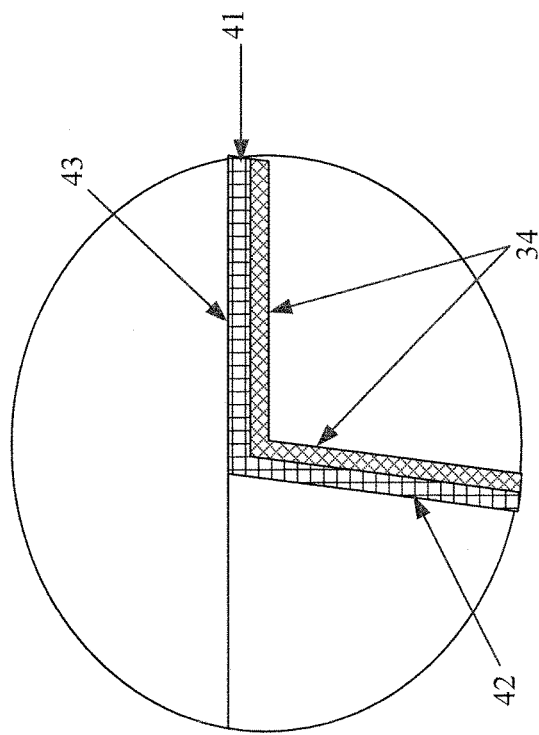
FIG. 4B
FIG. 4D
FIG. 4C

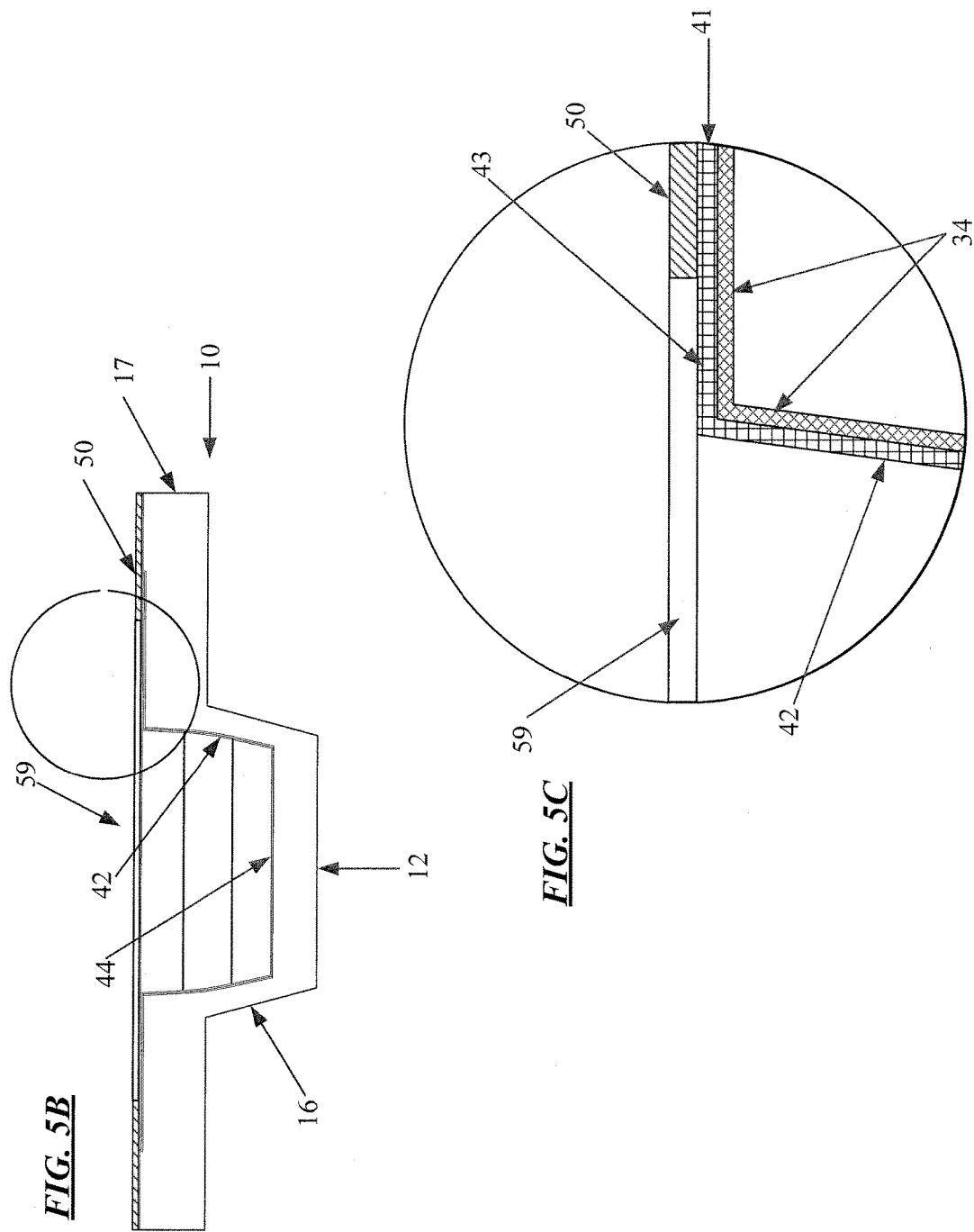

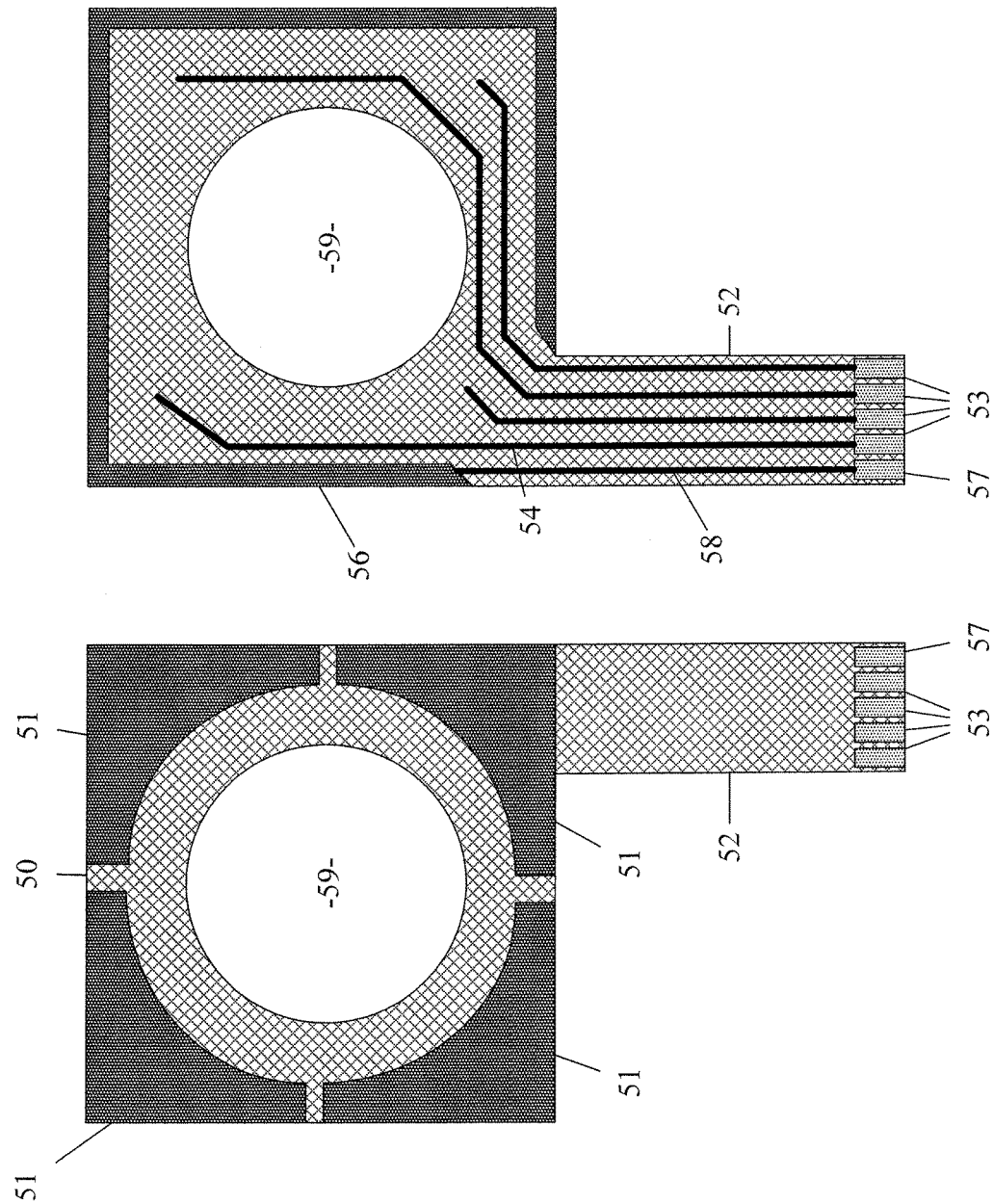

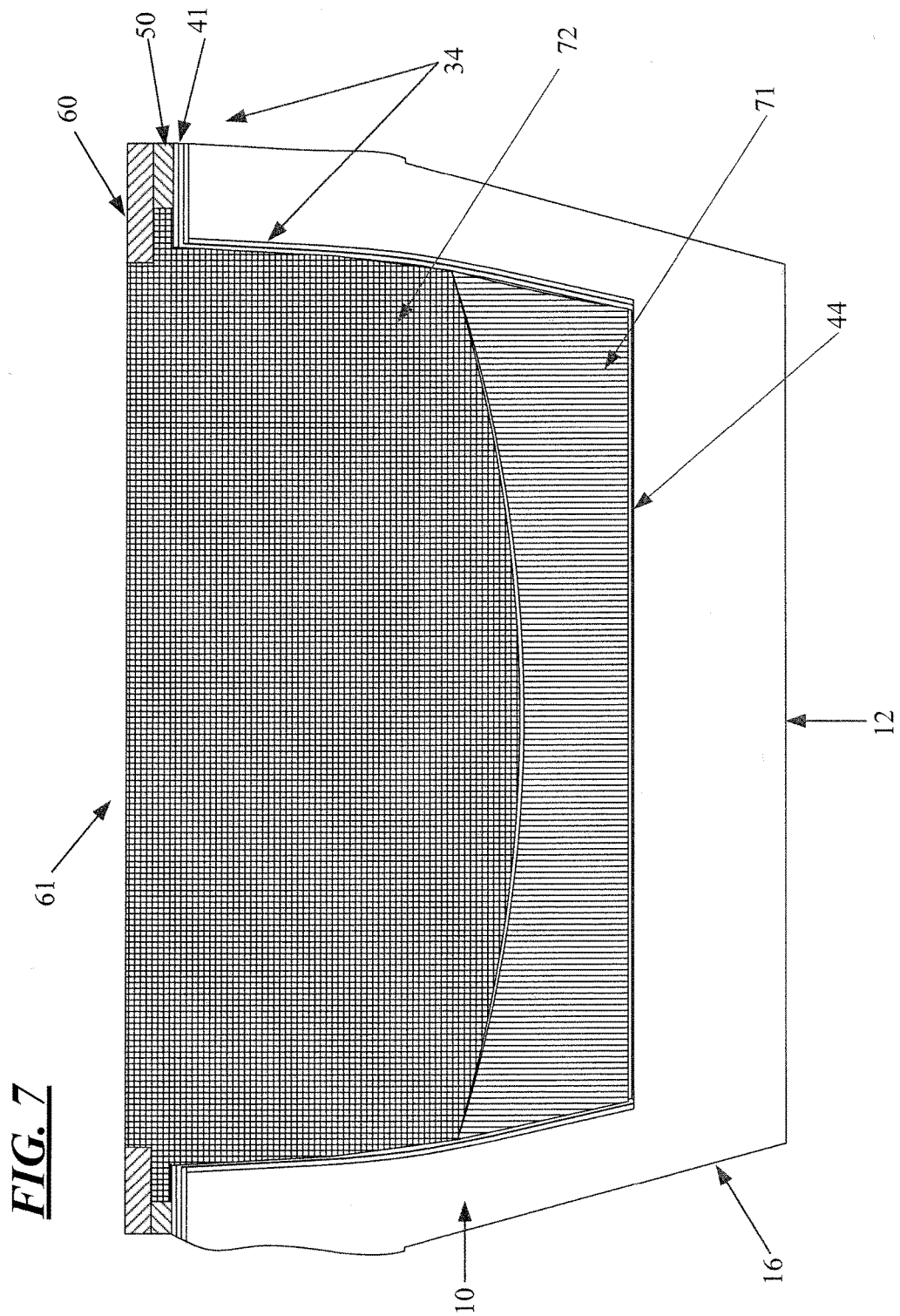

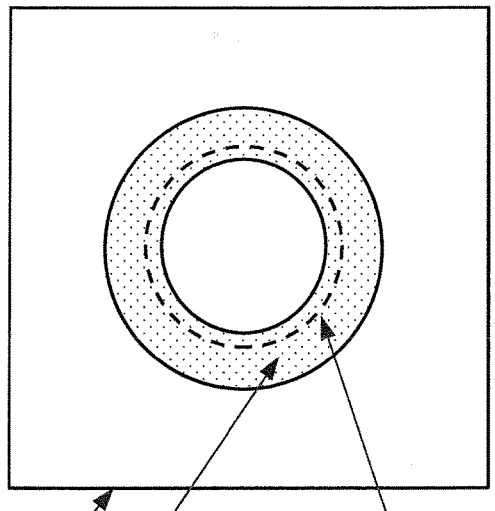
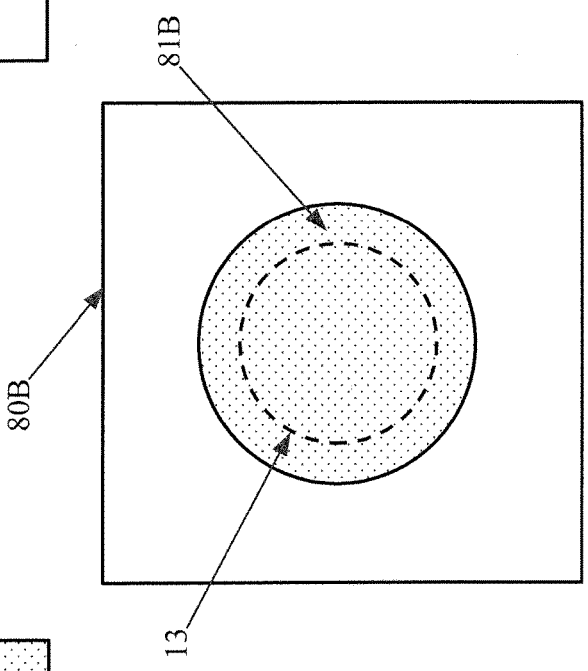
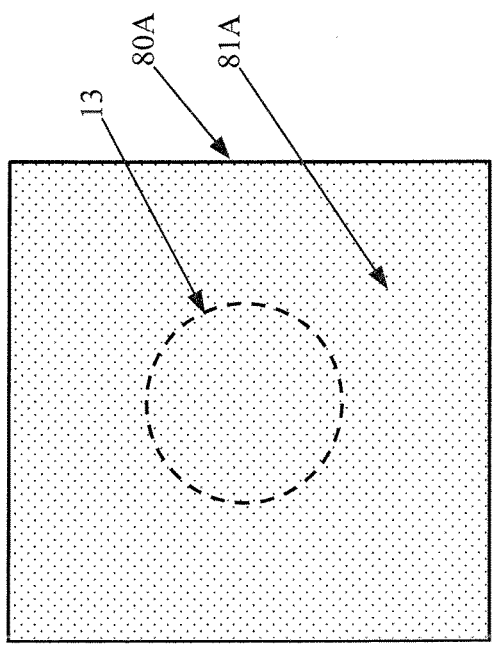
FIG. 8C
FIG. 8B
FIG. 8A

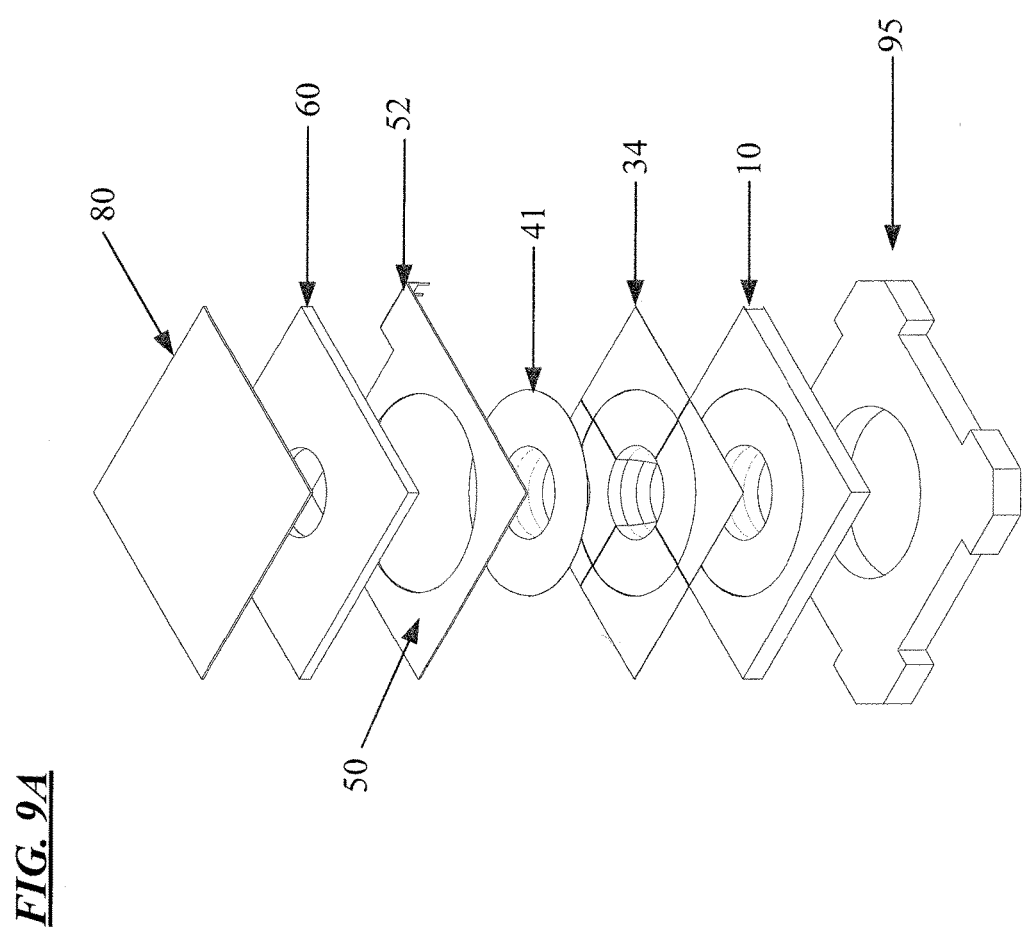

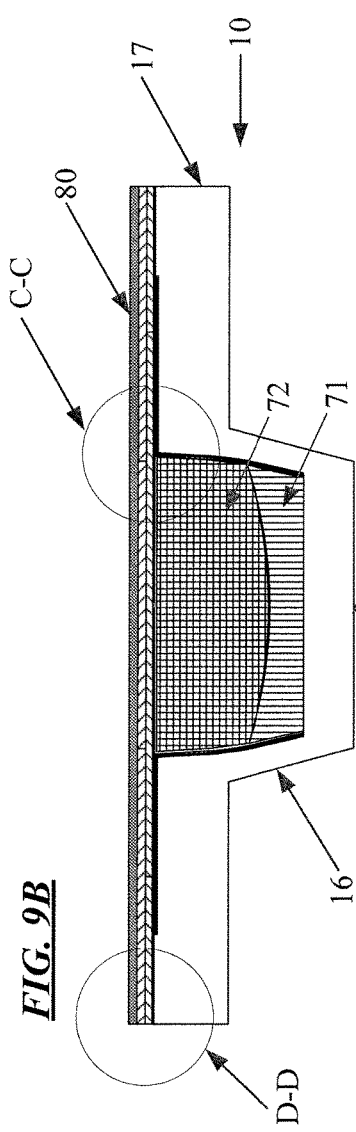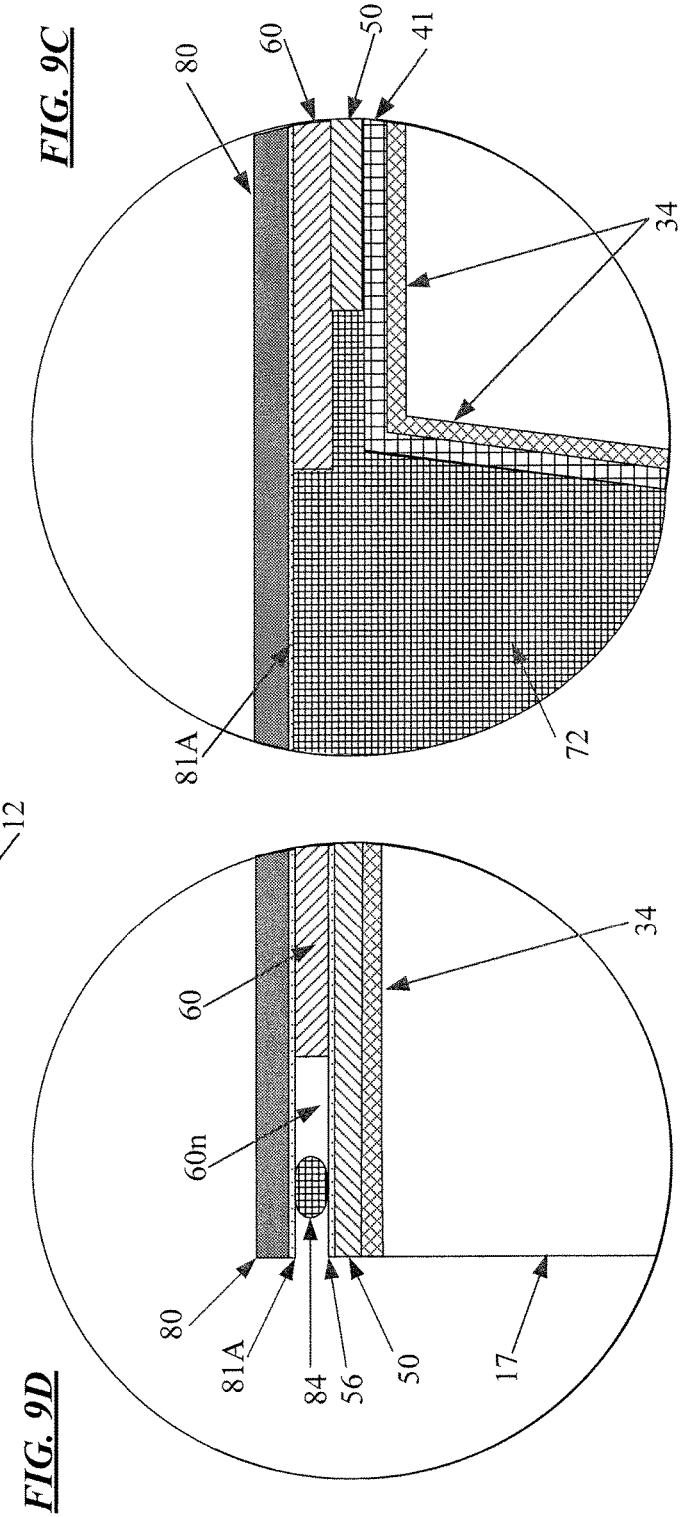

ELECTROWETTING ASSEMBLY TECHNIQUE AND CELL STRUCTURE

TECHNICAL FIELD

The present subject matter relates to techniques for assembling an electrowetting cell, e.g. fluid lens or prism, for beam shaping or steering applications and/or to structures of such electrowetting cells.

BACKGROUND

Electrowetting is a microfluidic phenomenon that modifies the shape of a liquid in relation to a surface by applying an electrical field, e.g. by applying a voltage across two electrodes. For example, if the surface is hydrophobic, the electrical field causes a change in the shape of the liquid that appears to change the wetting properties of the hydrophobic surface. If the fluid(s) in an electrowetting cell and some of the wall(s) around the fluid(s) are sufficiently transparent, the electrowetting cell may be used as an electrically controllable optic. Such optics have recently been the subject of a widening scope of light processing applications, such as variable lenses, variable prisms, optical switches, displays, etc.

Electrowetting lenses, for example, are conventionally used in the camera industry. These lenses tend to be very small (several millimeters) and operate in a small tunable range (small range of output light angle). The thickness of the lenses are also typically less than half the lens size. An electrowetting cell structure for a lens for a camera application or the like, e.g. to selectively focus light input to an image sensor or to selectively control beam distribution of a flash, typically supports only beam shaping.

There have been proposals to develop variable optical prisms using electrowetting cell arrangements. An electrowetting lens may have various different shaped structures, e.g. round, square or rectangular. An electrowetting prism normally is square or rectangular. The overall working principle for either beam shaping or steering is the same—the voltage applied across the dielectric layer attracts the conducting liquid so as to change the wetting area of the cell and thus the shape of the liquid(s) in the cell.

SUMMARY

There is room for further improvement in techniques for assembly of an electrowetting cell and/or the structure of an electrowetting cell.

In a method example, a light transmissive member is prepared. The light transmissive member includes a well with a sealed distal end and an opening at a proximal end of the well. The light transmissive member also includes an electrode landing zone, around the opening at the proximal end of the well. The method also involves forming control channel electrodes electrically isolated from each other on the light transmissive member. Each control channel electrode includes a first part formed on a respective portion of an interior wall surface of the well and a second part formed on a respective portion of the electrode landing zone. Another step involves forming a dielectric layer, that includes a first portion covering the first parts of the control channel electrodes on the portions of the interior wall surface of the well and a second portion covering some but not all of the second parts of the control channel electrodes on portions of the electrode landing zone. The method further entails installing a flexible circuit board over at least some of the second parts of the control channel electrodes on the electrode landing zone. A surface of the flexible circuit board facing the electrodes has electrical contacts isolated from each other, and each electrical contact is located on the flexible circuit board to contact a part of a respective control channel electrode not covered by the dielectric layer. A flexible seal is installed on the second portion of the dielectric layer. The flexible seal surrounds and has an opening aligned around the proximal end of the well. This method also involves installing first and second fluids in the well. The first fluid is relatively non-conductive, and the first fluid is located at the sealed distal end of the well. The second fluid is relatively conductive, and the second fluid fills the remainder of the well to the opening at the proximal end of the well. The first and second fluids are immiscible with respect to each other. The method further entails forming a common electrode on at least a portion of a light transmissive plate. The light transmissive plate is installed over the flexible seal, in such a manner that the light transmissive plate covers the opening at the proximal end of the well, making electrical contact to second fluid and forms a contact seal with the flexible seal around the opening at the proximal end of the well.

In an example of an electrowetting cell, the cell includes a light transmissive member. The member has a well with a sealed distal end and an opening at proximal end of the well. The light transmissive member also includes an electrode landing zone around the opening at the proximal end of the well. The electrowetting cell also includes control channel electrodes that are electrically isolated from each other. Each control channel electrode includes a first part located on a respective portion of an interior wall surface of the well and a second part located on a respective portion of the electrode landing zone. A dielectric layer includes a first portion covering the first parts of the control channel electrodes on the portions of the interior wall surface of the well and a second portion covering some but not all of the second parts of the control channel electrodes on portions of the electrode landing zone. A flexible circuit board extends over at least some of the second parts of the control channel electrodes on the electrode landing zone. A surface of the flexible circuit board facing the electrodes includes electrical contacts isolated from each other. Each electrical contact is located on the flexible circuit board to contact a part of a respective control channel electrode not covered by the dielectric layer. A flexible seal is located on the second portion of the dielectric layer. The flexible seal surrounds and has an opening aligned around the proximal end of the well. The electrowetting cell also includes two fluids in the well. A first fluid is at the sealed distal end of the well, and the first fluid is relatively non-conductive. A second fluid fills the remainder of the well to the opening at the proximal end of the well. The second fluid is relatively conductive. The first and second fluids are immiscible with respect to each other. The electrowetting cell also includes a light transmissive plate and a common electrode on at least a portion of the light transmissive plate. The light transmissive plate is located in contact with the flexible seal. The light transmissive plate covers the opening at the proximal end of the well, making electrical contact to second fluid and forms a contact seal with the flexible seal around the opening at the proximal end of the well.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 1 is a flow chart illustrating examples of steps that may be performed in a method of assembling an electrowetting cell.

FIGS. 2 to 12B depict components of the electrowetting cell at the various stages of assembly by the example method of FIG. 1.

DETAILED DESCRIPTION

Figure 2C:
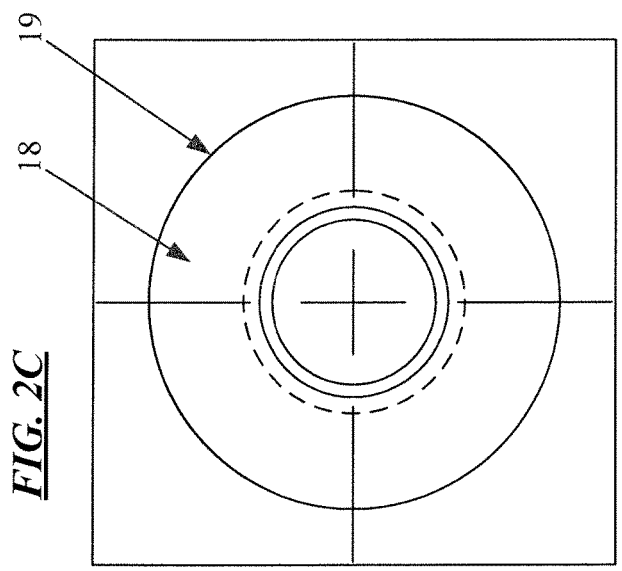

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Electrowetting is a fluidic phenomenon that enables changing of the configuration of a contained fluid system in response to an applied voltage. In general, application of an electric field seemingly modifies the wetting properties of a surface (e.g. the ability of fluid to maintain physical contact with a hydrophobic surface) in the fluid system. Assuming a two fluid system, where one fluid is relatively conductive, and the other is relatively non-conductive; when a fluid is in contact with a surface and that surface becomes charged, the electric field tends to pull the mass of the electrically conductive fluid towards the surface. As the conductive fluid changes shape due to this force, the non-conductive fluid also changes shape. On a micro scale, the contact angle is unaffected. On a macro scale it seems that the wetting properties have changed. This phenomenon enables controlled changes to the overall distribution and shape of the fluids with respect to the surface, in response to changes of the voltage(s) applied to change the electric field.

Examples of electrowetting optics described in detail herein and shown in several of the drawings use two immiscible fluids having different electrical properties. In at least some examples, the two fluids have different indices of refraction. One fluid may be conductive. The other fluid, typically the fluid adjacent to a hydrophobic surface, may be non-conductive. The conductive fluid may be a transparent fluid, but the other fluid may be substantially transparent or transmissive. Where both fluids are transparent or transmissive, the non-conductive fluid may exhibit a higher index of refraction than the conductive fluid. However, this is not necessary. In some examples, the non-conductive fluid may exhibit a lower index of refraction than the conductive fluid.

In a transmissive electrowetting optic example using two fluids, changing the applied electric field changes the shape of the fluid interface surface between the two fluids and thus the refraction of the light passing through the interface surface, for example, so that the electrowetting optic operates as a variable shape lens and/or a variable shape prism. Depending on the application for the electrowetting optic, the light may enter the fluid system to pass first through either one or the other of the two fluids.

As commercial applications for electrowetting cells expand, such cells are used in increasing numbers. Production and varied applications of large numbers of electrowetting cells call for improved assembly techniques, e.g. more efficient and/or providing a more effective yield rate. An effective cell structure should include a suitable electrode layout, fluid sealing and mechanical structure yet enable an efficient assembly methodology.

Prior cell structures and associated assembly technologies often did not support beam steering and shaping functions in one type of cell structure. Different cell structures were typically used for beam steering and beam shaping, limiting the applications of each type of cell structure. The example electrowetting cell structure described below, which may be assembled in an example method, may support both beam steering and shaping functions in the one cell design. The ability to support both types of optical processing in one type of electrowetting cell structure, for example, facilitates use of the one type cell in a wider variety of variable optic applications, e.g. as a variable lens, as a variable prism or as a combination lens and prism with variable optical capabilities.

Various examples disclosed herein relate to techniques for assembling an electrowetting cell, e.g. a fluid lens, a fluid prism or a single cell that may support both variable lens and variable prism functions. The resulting cell structure, for example, may support both beam shaping and steering functions, e.g. supporting use of the same electrowetting cell structure for a wider variety of optical processing applications.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below. FIG. 1 is a flow chart that shows steps of an example of a technique for assembling an electrowetting cell. FIGS. 2 to 11B depict components of the electrowetting cell at the various stages of assembly by the example method of FIG. 1; and the description of the process below will reference steps shown in FIG. 1 together with the component illustrations in FIGS. 2 to 11B. Although shown as being implemented in a particular order, the order of the steps is given by way of a non-limiting example. At least some of the assembly steps may be implemented in a different order.

Figure 2A:
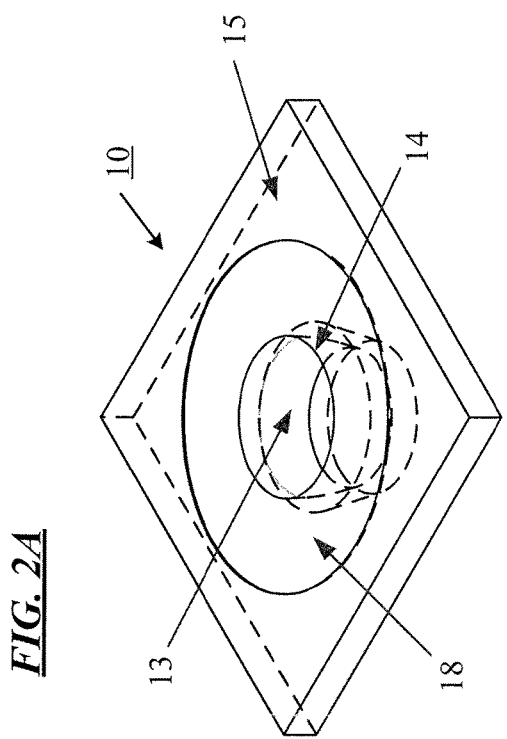
Figure 2B:
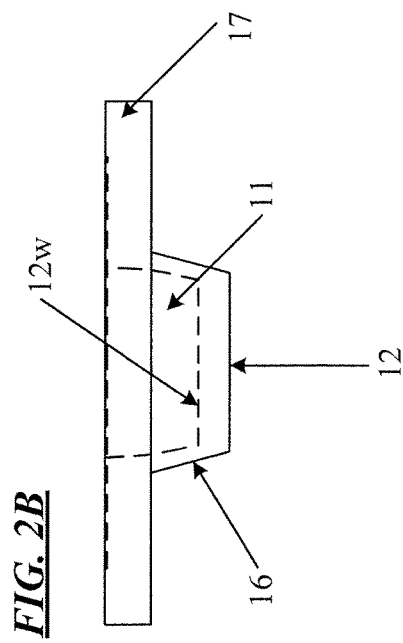

In the method example 1, of a cell assembly process flow as shown FIG. 1, step S1 involves preparing a light transmissive member. The member may be formed of a transparent acrylic or a transparent plastic material; although in the illustrated example, the light transmissive member is made of substantially transparent (e.g. highly light transmissive) glass. As shown in FIGS. 2A to 2C, the light transmissive member 10 includes a well 11. The well 11 has a sealed distal end 12 and an opening 13 at a proximal end 14 of the well 11. The well 11 also has an electrode landing zone 15 located around the opening 13 at the proximal end 14 of the well 11, on a shoulder section 17 of the member 11.

The entire member 10, however, does not need to be transparent over all of its surface, as long as the light path through the member 10 is transmissive. For example, the member 10 could also be made of two parts, a well wall structure (corresponding to tapered section 16) made of an oxidized aluminum part and a transparent glass piece or other transparent plastic to cover the bottom of the well (corresponding to sealed distal end 12). These two parts can be glued together or bonded/sealed together using other techniques to seal them together to form the member mentioned above. Additional sections of the member, such as the landing zone 15 shown on shoulder 17, may be formed integrally with one of the parts of the well (e.g. with the oxidized aluminum wall structure) or formed as separate component(s) and bonded to the respective part (wall or bottom) of the well 11. The overall member 10 may be formed of any number of elements of any variety of suitable materials as long as the distal end 12 of the well 11 is transparent, since other surfaces of the member typically do not influence the optical path.

For purposes of further discussion of an illustrated example, however, we will concentrate on a cell arrangement that utilizes a member 10 that is formed of a unified transparent material. The light transmissive member 10, for example, may be a single, solid glass element having a cylindrical or tapered section 16 and a surrounding shoulder section 17. The example of the shoulder 17 is square, although the shoulder 17 may have other shapes (e.g. round, rectangular, hexagonal, etc.). The well 11 is a hollow chamber formed through the shoulder section 17 and within the section 16. The well 11 may be cylindrical or somewhat contoured along its length between the distal and proximal ends of the well. In the example, the opening 13 at the proximal end 14 of the well 11 is circular, and the cross sectional shape of the well 11 at various distances along the length of the cell is circular (although possibly of different diameters along the length of the well). Other shapes of the opening 13 and/or the well cross-section may be used, e.g. square, rectangular, hexagonal, octagonal, etc. The circular shapes used in the example, however, are suitable for supporting lens and/or prism functions of the cell. A well with such circular shapes may be easier to manufacture, and/or other elements of the cell structure may be easier to assemble.

In the illustrated example, the proximal surface of the shoulder section 17 of the light transmissive member 10 forming the electrode landing zone 15 includes a doughnut or ring shaped indentation 18 around the opening 13, bounded at 19 by remaining areas of the electrode landing zone 15 that extend somewhat further away from the distal region of the member 10 (than the level of the indentation 18). The purpose of the indentation 18 is discussed later, in relation to later steps of the example assembly method 1. The indentation 18 is an optional feature. The surface of the shoulder section 17 of the member may instead be flat or extruded, for example, to support a different sealing technique.

Returning to the flow of the method shown in FIG. 1, the next step (S2) entails forming control channel electrodes electrically isolated from each other on the light transmissive member. Each control channel electrode has a first part formed on a respective portion of an interior wall surface of the well and a second part formed on a respective portion of the electrode landing zone.

Figure 3B:
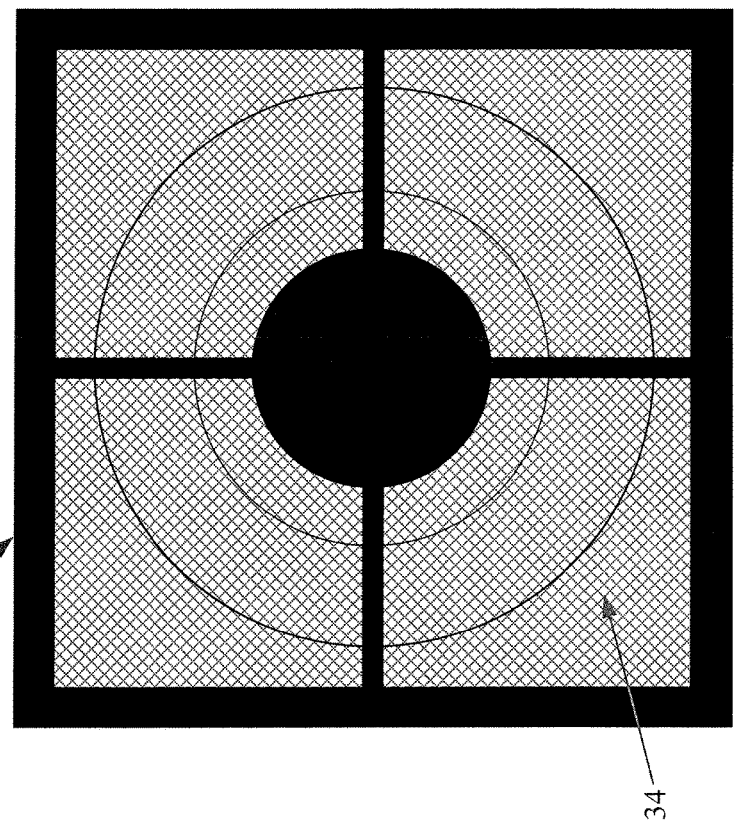
Figure 3A:
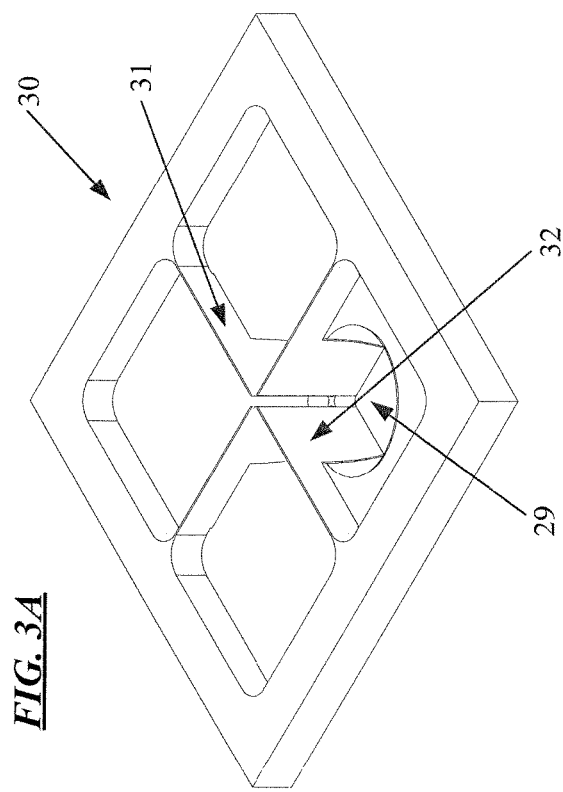

FIG. 3A shows a shadow mask that can be used during metal deposition process to generate isolated electrodes. The shadow mask, however, is not the only way to generate isolated electrodes; some other method like laser cutting could also be used. In the illustrated example, (e.g. FIGS. 3B to 3E) the first parts of the control channel electrodes are formed on areas of the lateral wall surface(s) 33 of the well of the light transmissive member (FIG. 3D) but not on the interior wall surface 12w at the sealed distal end 12 of the well 11 (see FIGS. 2B and 3D). The example electrodes extend along the length of the well approximately from the perimeter of the opening to the perimeter of the interior wall surface at the sealed distal end of the well. This configuration of the first parts of the control channel electrodes is given by way of a non-limiting example, although alternative arrangements may be used. For example, the first parts of the control channel electrodes may extend inward across some or all of the interior wall surface at the sealed distal end of the well; or part of the way along the lateral surface of the well from the perimeter of the opening toward (but not all the way to) the perimeter of the interior wall surface at the sealed distal end of the well.

The control channel electrodes may be formed in step S2 in a variety of different ways. Although other conductors may be used, an example uses aluminum to form metallic control channel electrodes. The electrodes are formed in a pattern. If the electrodes, for example, are formed of a metal like aluminum, the metal may be deposited by sputtering or the like; and the pattern for the metal electrodes may be determined by a shadow mask applied before deposition or by laser cutting of the metal after deposition. The drawings illustrate a shadow mask type procedure in sub-steps S2a to S2c, as also illustrated in FIGS. 3A to 3D.

In the example of step S2 shown in the drawings, forming control channel electrodes involves a step S2a of applying a shadow mask 30 to regions of the light transmissive member intended to be free of control channel electrode material. A variety of materials and processing techniques may be used to form the shadow mask 30.

As shown in FIG. 3A, the shadow mask 30 includes bars 31 extending across the electrode landing zone 15 and at least a portion of the well. The bars contact the surface(s) of the landing zone 15, including the ring shaped indentation 18. The shadow mask 30 also includes an extension 32 at the end of or connected to the portion of each bar 31 over the well. Each extension 32 (FIG. 3A) contacts a portion of the lateral inner wall 33 (FIG. 3D) of the well in the light transmissive member, as shown in the plan view of FIG. 3C. The mask also could be made to cover some or all of the interior wall surface 12w at the sealed distal end 12 of the well 11, as represented by the disk 29 of mask material shown in FIG. 3A. The inclusion of the disk 29 avoids metal deposition at the bottom of the well. Openings through the mask 30 on the shoulder section and/or lack of coverage of the mask on particular portions of the inner wall of the well allow for deposition of electrode material 34 (see e.g. FIG. 3B), as discussed in more detail below.

Figure 3C:
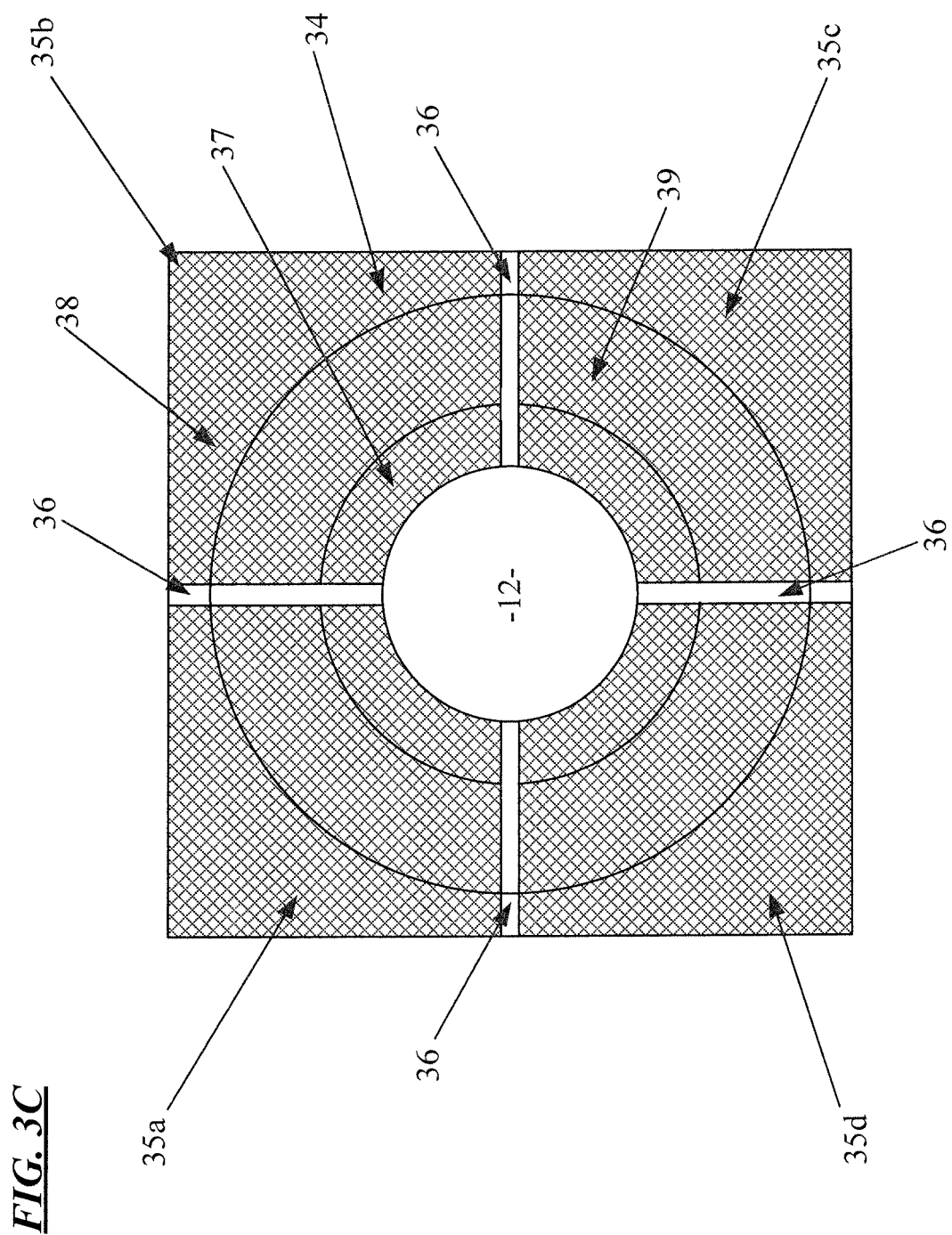

Although there may be other numbers of control channel electrodes, the illustrations in FIGS. 3A to 3C depict an electrode formation step S2 with a mask 30 configured to form four electrically isolated control channel electrodes. Hence, the example shows the mask 30 having four sets of bars 31 and associated well extensions 32. Procedures to assemble electrowetting cells with a different (larger or smaller) number of control channel electrodes on the landing zone and in the well may use a mask having different numbers of bars and associated well extensions. Also, the illustrations in FIGS. 3A to 3C depict an electrode formation step S2 intended to produce similarly sized/shaped electrodes, however, the bars and extensions may be at different locations to produce other relative sizes or different shapes of the desired control channel electrodes.

The bars 31 are shown approximately aligned with centers of the sides of a square periphery of the landing zone 15. Other alignments may be used. In an alternate example with a square periphery of the landing zone, the bars 31 might lie on diagonals of the square or on other lines across the square. Other alignments may be appropriate if different landing zone shapes are utilized.

The bars 31 and extensions 32 have widths sufficient to form isolation channels as empty regions or gaps between the resultant electrodes. The widths of elements 31, 32 and the resultant isolation channels is sufficient to prevent direct flow of current between the electrodes if/when a voltage difference exists between two adjacent ones of the control channel electrodes at the operating voltages typical for a particular electrowetting cell design and expected applications of that cell design. Some parts of the isolation channels or gaps may be filled with the dielectric or other insulating material in a later processing step, e.g. to seal out liquids used in the cell and/or provide increased electrical insulation between the control channel electrodes.

In step S2b, electrode material 34 is deposited at least on regions of the light transmissive member not covered by the shadow mask 30. Typically, the deposited material 34 covers exposed surfaces of the transmissive member, as well as at least some of the mask. The material 34 may be a metal such as Aluminum, although other conductors may be used. A metal such as Aluminum would be reflective, although some transparent materials such as Indium Tin Oxide (ITO) may be used. A variety of metal deposition techniques also may be used to deposit the electrode material 34. FIG. 3B shows the mask 30 and shows the deposited electrode material 34 on the light transmissive member as seen through the mask, for example, as a top plan view when considering the cell structure as oriented by way of example in other drawings.

In many such techniques, some of the electrode material 34 may also be deposited on portions of the shadow mask 30. The shadow mask is removed in step S2c (which also serves to remove any of the electrode material that may have been deposited on the shadow mask 30). Various removal techniques may be used. A particular removal technique may be chosen, for example, to efficiently remove the particular material(s) used to form the shadow mask 30 and/or to minimize any possible damage to the control electrode material 34 during the removal operation.

Figure 3E:
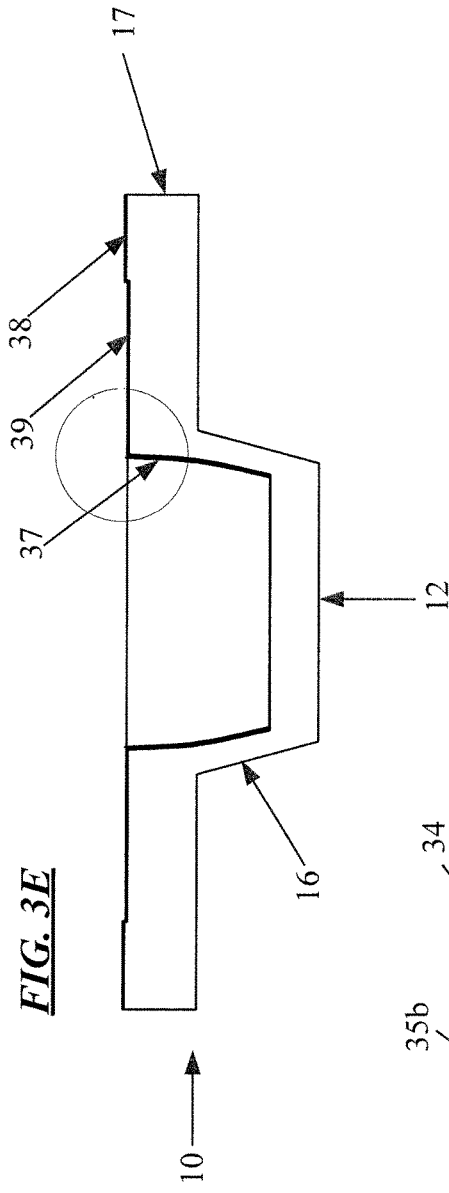
Figure 3F:
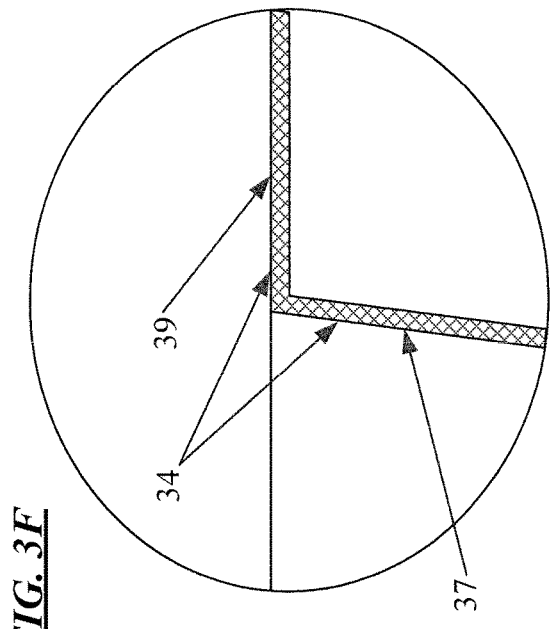
Figure 3D:
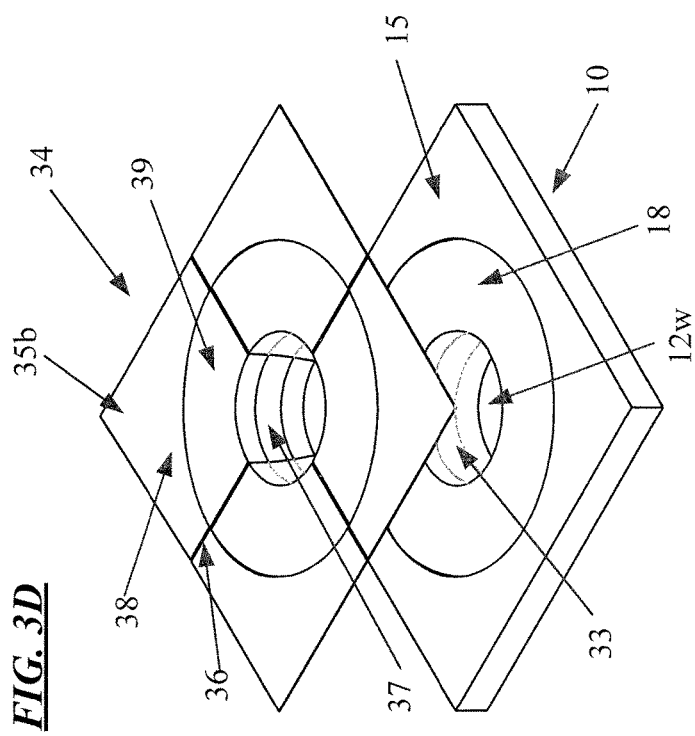

FIG. 3C is a plan view, FIG. 3D is an exploded view, and FIG. 3E is a cross-sectional view, all after removal of the shadow mask, i.e. after completion of step S2c of FIG. 1. FIG. 3F is an enlarged view of a portion of the cross-sectional view, corresponding to the circled section in FIG. 3E. The example produces four conductive metal electrodes 35a to 35d, as the control channel electrodes for the electrowetting cell. As noted earlier in the discussion, the removal of the shadow mask is intended to leave empty channel regions or gaps, shown at 36, between the control channel electrodes 35a to 35d formed by the material 34 (see FIG. 3C). The gaps 36, for example, provide electrical isolation between the control channel electrodes. The locations and widths of the gaps 36 for the isolation channels are determined by the thickness and widths of the bars and extensions of the shadow mask, as discussed earlier in relation to FIG. 3A. As referenced for discussion purposes on the electrode 35b in FIG. 3C, each of the control channel electrodes 35a to 35d has a first part 37 located on a respective portion of the interior wall surface of the well and a second part 38 located on a respective portion of the electrode on the landing zone 15 (see FIGS. 3C to 3F). As shown in FIG. 3C, the sealed distal end 12 of the well is at least substantially free of electrode material, in this example, after mask removal step S2c.

It should be noted that the configuration (e.g. shapes, widths, or locations around the well) of the control channel electrodes 35a to 35d may be changed, for example to achieve desired performance goals, for ease of manufacturing, use of desired conductive materials, etc. The illustrated control channel electrode configurations are shown by way of examples only. Assuming alternative electrode configurations are constructed using the shadow mask technique, the shadow mask would be changed in a corresponding manner. Hence, the shape of the shadow mask is likewise shown by way of example only.

Figure 4A:
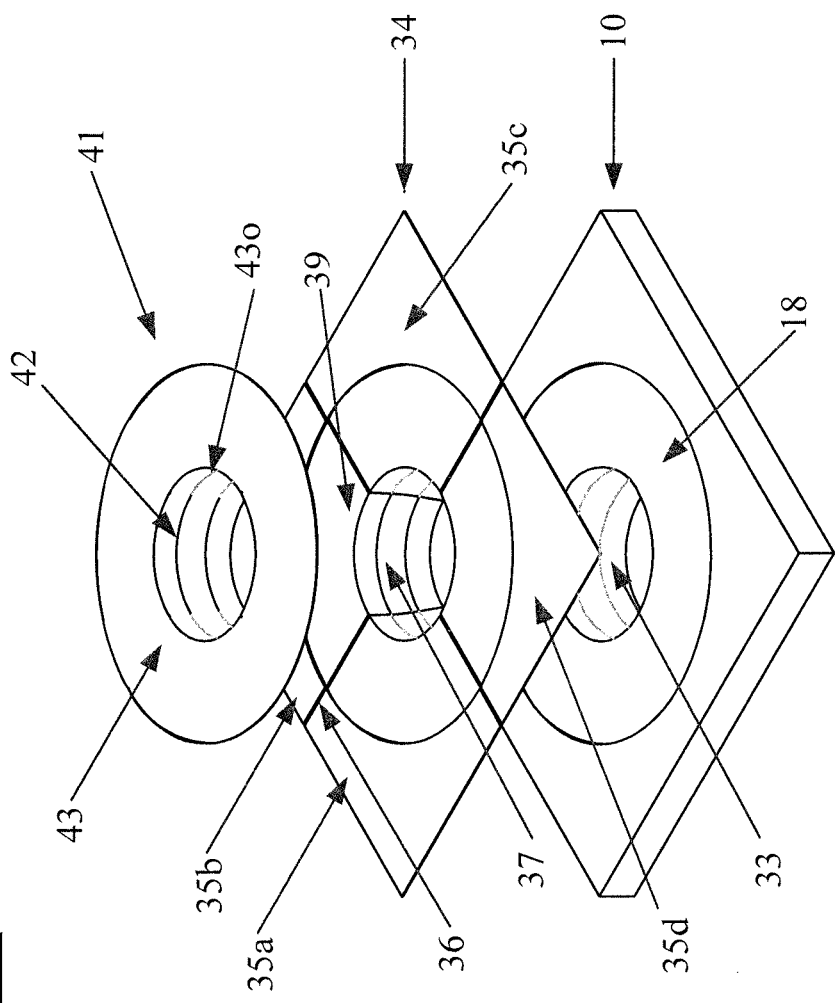

Returning again to the flow of the method shown in FIG. 1, step S3 involves forming a dielectric layer. FIG. 4A is an exploded view, and FIG. 4B is a cross sectional view, of the portion cell assembled through step S3 at this point in the process of FIG. 1. FIG. 4C is an enlarged view of a portion of the cross-sectional view, corresponding to the circled section in FIG. 4B. FIG. 4D is a plan view (top view corresponding to the illustrated orientation of FIGS. 4A and 4B) of the cell completed through step S3 at this point in the assembly process. The dielectric layer, shown at 41 includes in the exploded view of FIG. 4A, a first portion 42 covering the first parts 37 of the control channel electrodes 35a to 35d on the portions of the interior wall surface 33 of the well and a second portion 43 covering some (e.g. at 39) but not all of the second parts of the control channel electrodes 35a to 35d on portions of the electrode landing zone (see FIGS. 4A and 4B). The second portion 43 has an opening 43o at the junction thereof with first portion 42 of the dielectric layer 41. The opening 43o of the dielectric layer 41 aligns with the well. In the example, the dielectric layer 41 also includes a portion 44 (see FIGS. 4B and 4D) that covers the glass at the sealed distal end 12 of the well.

As noted in the discussion of step S1 above, in the example illustrated in FIGS. 2 to 3D, the original glass member 10 has an indentation in the form of a ring 18 surrounding the well opening 13 (see e.g. FIG. 2A). The metal forming the electrodes 35a to 35d follows the contour of the glass so that there is still an annular indentation 39 (see FIG. 3C) surrounding the well opening. The portion 43 of the dialectic layer 41 formed around the well opening fills the annular indentation 18 (e.g. compare FIG. 4A to FIG. 3C) in the portions of the control channel electrodes 35a to 35d on the landing zone, to a level approximately flush with the exposed surfaces of those portions of the control channel electrodes 35a to 35d on the landing zone (see FIG. 4B). Although there may be some irregularities resulting from the particular layer formation techniques, the still-exposed portions of the control channel electrodes 35a to 35d on the landing zone together with the ring shaped section 43 of the dielectric layer 41 together may form a substantially planar surface extending from the periphery of the opening of the well out to the lateral edges of the electrodes/landing zone.

The substantially planar surface may facilitate fluid tight sealing of the cell, in subsequent steps of the cell assembly process. Alternatively, the portion 43 of the dialectic layer 41 formed around the well opening may have a somewhat different height, e.g. above or below the still-exposed portions of the control channel electrodes 35a to 35d on the landing zone, for example, to facilitate use of a particular seal configuration in a later step of the assembly process.

The material of the dielectric layer 41 also fills portions of the isolation channel gaps 36 that are within the well and portions of the isolation channel gaps 36 that are within the boundary of the annular indentation 39 in the electrodes 35a to 35d surrounding the well opening. Although not shown, dielectric material may also be applied to fill the remainder of the gaps 36.

In an example, the dielectric layer 41 also is hydrophobic. For optical applications of the electrowetting cell in which light may pass through the well and possibly other portions of the cell, the dielectric also is transparent. An example of a suitable material is Parylene C, although other dielectric materials may be used. The Parylene C or other dielectric material may be applied to form the dielectric layer 41 in a variety of different ways. One example of a suitable approach for applying Parylene C uses a shadow mask technique analogous to the shadow mask procedure used in steps 2a to 2c to form the control channel electrodes. Such a technique, for example, may form the dielectric layer 41 in the indentation 39 but leave the rest of the second part 38 of each electrode located on the landing zone clear of the dielectric material to facilitate electrical connections via those clear sections of the second parts 38 to the control channel electrodes 35a to 35d, in a later step of the assembly process 1.

A flexible circuit board is installed over the second parts of the control channel electrodes on the electrode landing zone in step S4 in the process 1 of FIG. 1. In the assembly structure example for this step (FIGS. 5A to 5C), the flexible circuit board 50 does not completely cover the dielectric layer 41, including portions 42, 43, although there may be some overlap. A surface of the flexible circuit board 50 facing the electrodes (FIG. 5D) includes electrical contacts 51 isolated from each other. Each electrical contact 51 on the flexible circuit board 50 is located on the board 50 so as to contact a part of a respective control channel electrode not covered by the dielectric layer 41. The locations and shapes of the electrical contacts 51 are given by way of example, here an example intended for use with electrodes 35a to 35d of the shapes and at locations as shown in earlier drawings. Other control channel contact configurations may be used, either with the example electrodes or with other configurations of the control channel electrodes. The surface of the flexible circuit board 50 carrying the electrical contacts 51 as shown in FIG. 5D would be the bottom surface of the board 50 as the cell is being assembled in the orientation as shown by way of example in the exploded view of FIG. 5A.

Figure 5A:
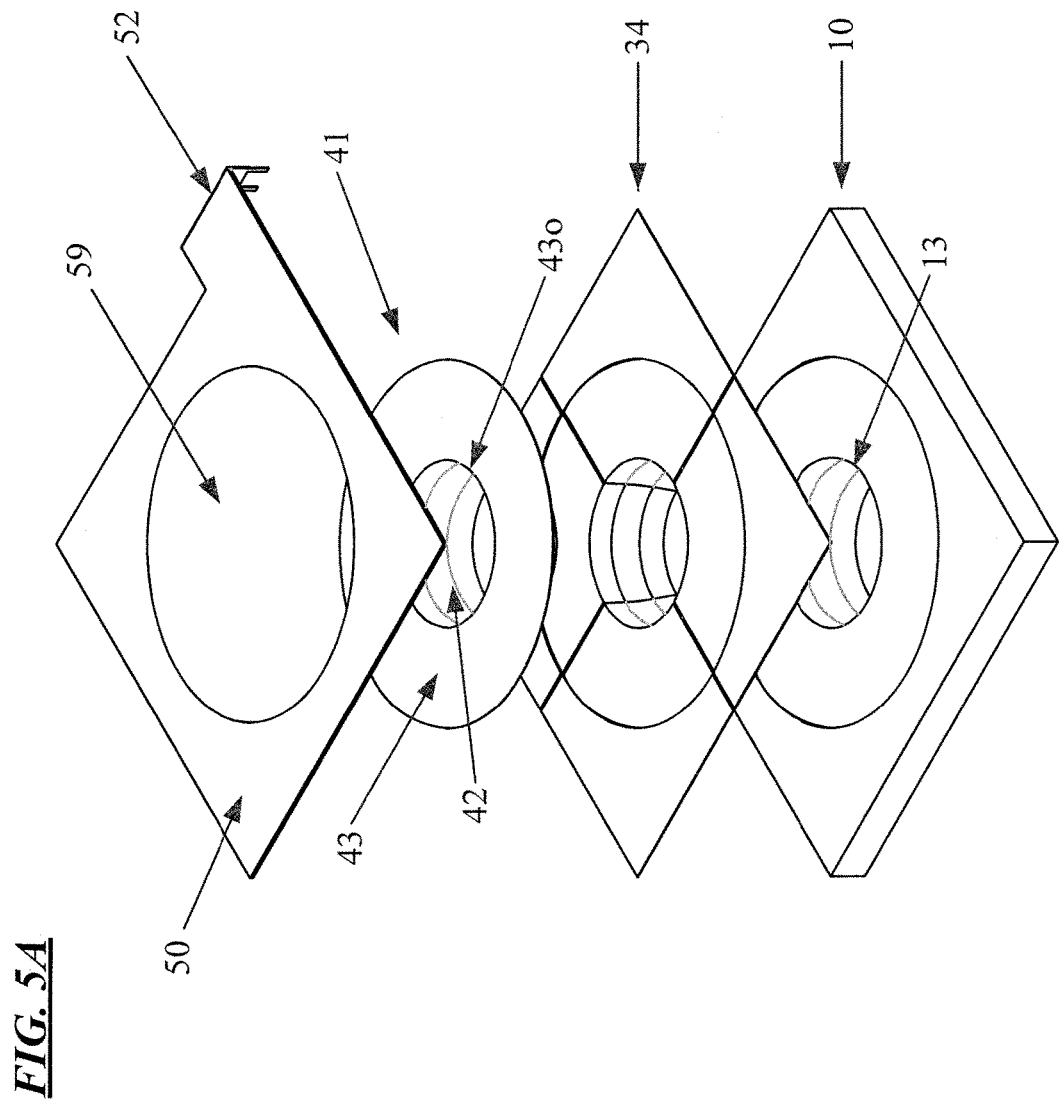

In the example, the flexible circuit board 50 has an outer perimeter that is mostly square and follows/aligns with the peripheral edges of electrodes and the electrode landing zone on the shoulder 17 of the glass member (see FIG. 5A). The exception is that the flexible circuit board 50 includes a tail 52, in the example, as an extension of the flexible circuit board 50 at one corner of the shoulder 17. Other locations of the tail may be used. The flexible tail 52 of the circuit board 50 (FIG. 5A) carries electrical connectors 53 (shown in FIGS. 5D and 5E) for attachment to external circuitry.

The opposite surface of the flexible circuit board 50 (see FIG. 5E) carries leads in the form of metal traces 54 between the connectors 53 and the electrode contacts 51. The traces may extend from the tail 51 toward the contacts 51, across either surface of the flexible circuit board 50. The traces 54 in the example connect to the electrode contacts 51 on the surface of the flexible circuit board 50 facing the control channel electrodes through vias in the insulating substrate of the flexible circuit board 50. The connectors 53, lead traces 54 and the contacts 51 provide electrical connectivity to the control channel electrodes. The opposite surface of the flexible circuit board 50 (FIG. 5E) with leads in the form of metal traces 54 would be the top surface of the board 50 as the cell is being assembled in the orientation as shown by way of example in the exploded view of FIG. 5A.

As shown in FIG. 5E, the surface of the flexible circuit board 50 intended to face away from the control channel electrodes also carries an electrode contact 56 intended to contact a common electrode mounted on a member that will be added to the assembly in a later step. In the example, the electrode contact 56 is formed along much of the perimeter of the flexible circuit board 50. The tail 52 of the flexible circuit board 50 carries electrical connector 57 and a lead trace 58 between the common electrode contact 56 and the electrical connector 57. The connector 57, lead trace 58 and the contact 56 provide electrical connectivity to the common electrode.

The approximately square section of the flexible circuit board 50 has a circular opening 59 aligned with the axis for the well and the openings through the other layers of the cell. The size of the opening 59 may be approximately the same as (e.g. the exact same size, or larger than or smaller than) the outer perimeter of the portion 43 of the dielectric layer 41 formed over the indentation 39 (see also FIG. 4A). For example, the portion 43 of the dielectric layer 41 formed over the indentation may extend outward from shoulder section 17 of the glass member 10 through the opening 59 to a level approximately corresponding to the level of the uncovered portions of the control channel electrodes 35a to 35d.

In the example shown in FIGS. 4B and 5B, the portion 43 of the dielectric layer 41 formed over the indentation extends to a level approximately corresponding to the surface of the shoulder 17 (filling the indentation). The opening 59 of the flexible circuit board 50 is somewhat smaller than the outer periphery of the dielectric layer 41. As result, a small portion of the flexible circuit board 50 along the inner periphery of the circuit board 50 around the opening 59 may overlap a bit of the outer periphery of the dielectric layer 41 formed over the indentation 39.

Alternatively, the thickness of the dielectric layer 41 formed over the indentation 39 may be increased in the area corresponding to the opening 59 to account for the thickness of the flexible circuit board 50, so that the portion 43 of the dielectric layer 41 formed over the indentation 39 may extend outward from the glass member to a level approximately corresponding to the level of the back surface (top surface away from the electrodes in the example orientation of exploded view 5A) of the flexible circuit board 50. For example, the electrodes 35 and parylene C 41 form a continuous surface, electrodes are deposited by sputtering, and parylene C is deposited by evaporation machine.

Figure 6A:
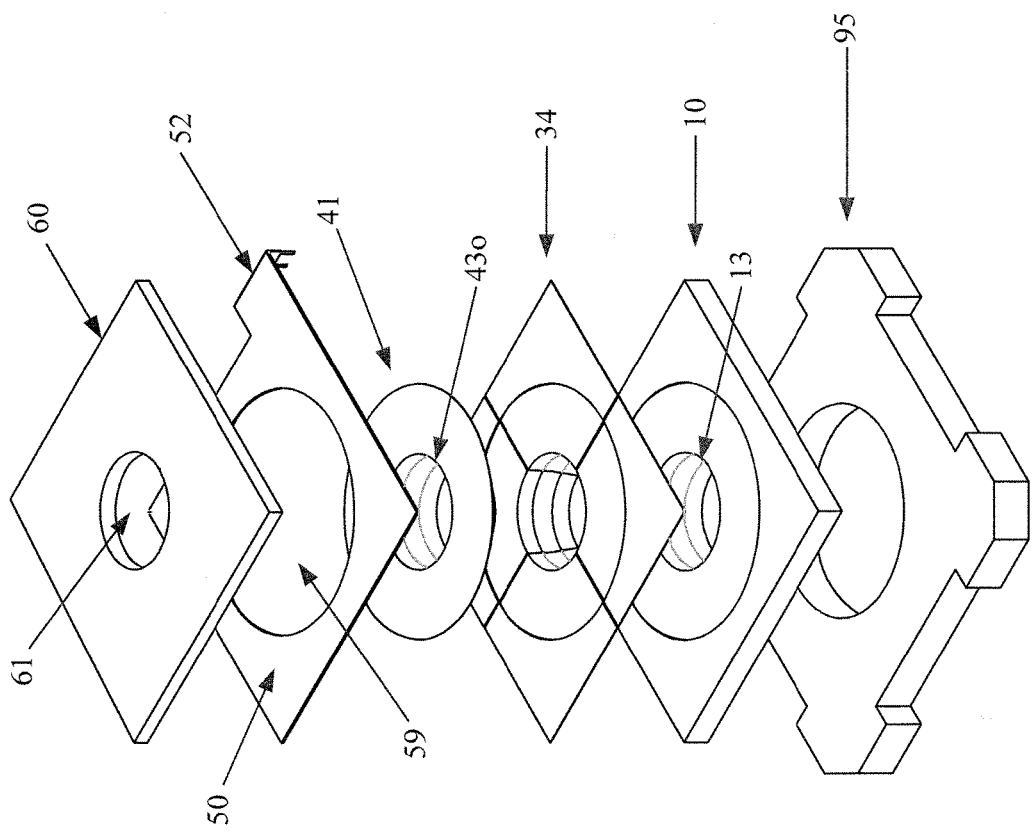
Figure 6B:
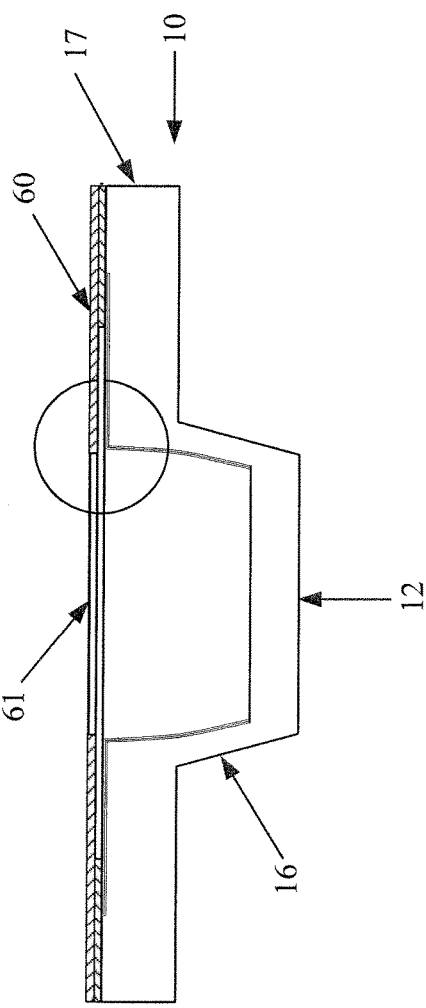
Figure 6C:
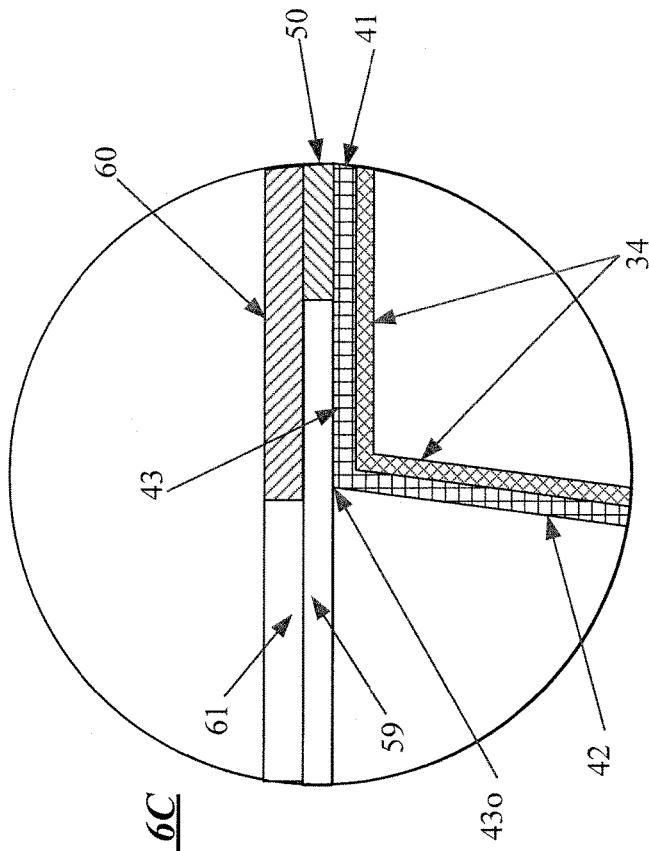

The next step in the process flow of FIG. 1, that is to say step S5, involves installing a flexible seal. The flexible seal surrounds and has an opening centered about the proximal end of the well. FIG. 6A is an exploded view, and FIG. 6B is a cross sectional view, of the portion of the cell assembled through step S5 in the process of FIG. 1. FIG. 6C is an enlarged view of a portion of the cross-sectional view, corresponding to the circled section in FIG. 6B.

FIG. 6A illustrates the exploded cell as assembled to this point in the process flow. Elements assembled earlier in the process are identified by reference numbers and are implemented/assembled as discussed above. The drawing shows the addition of the seal 60 to the stack. The drawing also shows a two one piece clamp 95 that will be discussed in more detail later.

Although other shapes of the seal may be used, the example shown in FIGS. 6A and 6B uses a flat flexible membrane as the seal 60. The membrane seal 60 extends over the flexible circuit board and the second portion of the dielectric layer. The flat flexible membrane type seal 60 will be compressed in a later step in the assembly, in the example, to provide pressure to the flexible circuit board 50, so that the various electrode contacts on the board 50 press against and electrically connect to the respective control channel electrodes. The compression will also improve the fluid tight sealing of fluids within the well implemented by the seal 60.

In such an implementation, the membrane of flexible seal 60 is formed of a suitably shaped sheet of a rubber or similar material that is inert with respect to the materials of the electrodes and the fluids and is sufficiently compressible. An example of a suitable flexible material is Viton™ available for example from Eagle Elastomer Inc., although other rubber-based or flexible plastics may be suitable.

The flexible seal 60 has an opening 61 aligned around the opening at the proximal end of the well, e.g. approximately corresponding to or slightly larger than the opening 43o through the dielectric layer 41. The alignment of the openings need not be absolutely precise, e.g. the edge of opening 61 may correspond to the edge of the opening 43o of the dielectric layer 41 or to the edge of the opening 13 at the proximal end 14 of the well 11 in the glass member 10 (see also FIGS. 2A and 2B), as shown. Alternatively, the edge of opening 61 may correspond to the edge of the opening of the electrode layer 34, or the opening 61 may be somewhat larger than the other openings but centered around the opening 13 of the well in the glass member 10.

In the example with a flat membrane design of the seal 60, at this stage of the assembly process, that seal 60 remains substantially flat. As a result, there may be some air gap between the dielectric layer 41 and the facing surface of the flexible seal 60, in this case, exposing some of the opening 59 of the flexible circuit board 50. Additional seal material could be provided in this area, for example, as a boss or extension of the flexible seal 60 or as an additional ring of a material the same as or similar to the material of the seal 60. In the example, however, a later step compresses the flexible seal 60 sufficiently to substantially fill the gap. Other approaches may be used. For example, if the flexible seal 60 is too thick, another approach might use an indent for the flat flexible membrane to compensate for the thickness of the flexible circuit board 50. The example includes an indent in the glass cell, however, an extruded step in the glass plate (shown in later drawings) opposite to the indent might compensate the thickness of the flex.

Alternatives to the flat membrane design of the seal 60, include for example, one or more O-rings or c-shaped seals, etc., formed of a suitable material. An O-ring, c-shaped seal or other alternative form of the seal 60 would still be located around the perimeter of the well and on the surface of the dielectric layer and may be located on the flexible circuit board.

Cell assembly method 1 of FIG. 1 also involves installing first and second fluids 56, 57 in the well. In the example of FIG. 7, the first fluid 71 is located at the sealed distal end 12 of the well and the second fluid 72 fills a remainder of the well to the opening 13 at the proximal end 14 of the well (see enlarged cross-sectional view of a region of the assembly in FIG. 7). The fluids 71, 72 may be installed in the well earlier in the process, e.g. before installation of the flexible seal in step S5. In the example, however, the seal 60 is installed first, after which the fluids 71, 72 are installed in the well. For example, if the seal 60 is a flexible membrane that covers the flexible circuit board, the prior installation of the seal may provide some protection of the circuit board from the fluids during further assembly.

Various techniques may be used to install the fluids 71, 72. The example flow of the assembly process shown in FIG. 1 includes a step S6 of installing the first fluid 71 in the well in contact with the sealed distal end 12 of the well, and a step S7 of filling a remainder of the well to the opening 13 at the proximal end 14 of the well with the second fluid 72. In the example, the filling step S7 fills the fluid to the height of the upper (in the example orientation) surface of the seal 60, e.g. through the openings in the dielectric layer 41, the flexible circuit board 50 and the seal 60.

In the example, the first fluid 71 is relatively non-conductive, and the second fluid 72 is relatively conductive. Also, the first and second fluids 71, 72 in the example are immiscible with respect to each other. The two fluids 71, 72 typically exhibit a difference in an optical characteristic, e.g. refractive index and/or reflectivity versus transmissivity.

Assume for purposes of further discussion of an example that the fluids 71, 72 in the example are immiscible and have different refractive indexes. The first (non-conductive, e.g. insulating) fluid 71 may be a suitable oil. Suitable fluids for use as the second (conductive) fluid 72 include alcohols, glycols, ionic liquids, or other suitable liquid materials that can conduct electrical or ionic charges adequately to enable the electrowetting operations described herein. Conducting fluids may contain salts or other additives to alter their electrical conductivities. Specific examples of relatively insulating fluids that may be used include relatively non-conductive 'oil,' liquids such as Dow Corning OS-20, dodecane, and silicone oil. Specific examples of relatively conductive fluids that may be used include aqueous solutions for the more conductive liquid, such as: aqueous mixtures of sodium dodecyl sulfate (SDS), aqueous mixtures of potassium chloride (KCl), and propylene glycol (PG).

In a method for assembling an implementation of the cell that uses water or a water based ion solution as the conductive second fluid 72, a number of the steps of the assembly method may be performed while the in-progress cell assembly is immersed or submerged in the conductive fluid. For example, a suitable amount of the non-conductive first fluid 71 can be inserted in the well (in step S6). Thereafter, the cell can be immersed in second fluid 72, and subsequent steps for filling the remainder of the well (step S7) through installation of a glass member and a flexible member over the glass to complete sealing of the cell (and possibly even the clamping together of the cell assembly discussed later) may be performed during continuous immersion in the conductive fluid 72 prior to installing the first fluid 71. In an alternative approach, the partially completed cell assembly may be immersed in the conductive second fluid 72. In this state, the conductive second fluid 72 fills the well. The non-conductive first fluid 71 may then be injected or otherwise instilled in the appropriate amount through the conductive fluid 72 to form a suitable amount of fluid 72 at the distal end 12 of the well. Again, some or all of the subsequent steps of the cell assembly method may be performed during continuous immersion in the conductive fluid 72. The continuous immersion, for example, tends to mitigate against entraining air or other vapor as bubbles in one or the other of the fluids within the electrowetting cell during the cell assembly process.

Retuning to FIG. 1, in this example, the next step (S8) is forming a common electrode on at least a portion of a light transmissive plate. Although shown at a particular point in the process flow, the electrode formation step may be implemented in parallel with other process steps or even earlier (off-line) before some or all of the other initial steps begin.

The light transmissive plate may be formed of various transparent materials, but for purposes of further discussion, we will refer to an example in which the light transmissive plate is formed of a substantially flat sheet of glass. FIGS. 8A to 8C are plan views of examples 80A to 80C of the glass plate with different implementations 81A to 81C of the common electrode. As discussed, later, the electrode configuration 81A of FIG. 8A is intended for use with the example circuit board configuration shown in FIG. 5E, with the common electrode contact 56 around the periphery of the surface of the flexible circuit board 50. The other electrode configurations of FIGS. 8B and 8C would be used with different arrangements for the common electrode contact(s).

In the process example 1 (FIG. 1), step S9 involves installing the light transmissive glass plate 80 (FIGS. 9A, 9B) over the flexible seal 60, with the surface that carries the common electrode facing toward the flexible seal 60. In the example outlined earlier, in which the assembly developed through step S7 is thereafter maintained immersed in water, the light transmissive plate 80 is immersed in the water and slid into place on the assembly over the flexible seal 60. FIG. 9A is an exploded isometric view, and FIG. 9B is a cross-sectional view of the assembly after installation of the light transmissive glass plate 80 over the flexible seal 60. FIG. 9C is an enlarged view of a portion of the cross-sectional view, corresponding to the circled section in FIG. 9B.

FIG. 9A illustrates the exploded cell as assembled to this point in the process flow. Elements assembled earlier in the process are identified by reference numbers and are implemented/assembled as discussed above. The drawing shows the addition of the glass plate 80 to the stack.

Returning to the electrode formation in step S8, in examples like those of FIGS. 8A to 8B at least a portion of the common electrode 80 extends at least partially into the optically active region of the cell, that is to say over some or all of the well in the illustrated cell structure example. The light transmissive common electrode 80 may be formed of a transparent metal such as indium tin oxide (ITO), silver or other metal nanowire mesh, etc. For cell assembly structures in which the common electrode may contact one of the fluids within the well without extending into the optically active region intended for light passage through the cell, the common electrode may be formed of a suitably conductive metal or the like that need not be particularly transmissive with respect to light.

More specifically, FIG. 8A shows an example 80A in which the common electrode is formed of a transparent electrode material 81A extending entirely across the relevant surface of the light transmissive glass plate 80. The light transmissive glass plate 80A will be located in contact with the flexible seal 60 (see 80 in FIGS. 9A and 9B), in such a manner that the light transmissive glass plate covers the opening at the proximal end of the well. In FIG. 8A, the dotted line circle 13 corresponds to the perimeter of the opening at the proximal end of the well. Since the well is filled with the fluids before step S9 in the process flow (FIG. 1), the portion of the transparent electrode material 81A extending entirely across the opening at the proximal end of the well, i.e. the portion of the electrode 81A inside the dotted line circle, electrically contacts the conductive second fluid within the well. The circuit board example 50 in FIG. 5E includes a common electrode contact 56 suitable for use with the common electrode 81A of FIG. 8A. Of course, other common electrode configurations may be used.

In FIG. 8B, the transparent conductive material forming the common electrode 81B extends entirely across the perimeter of the opening 13 at the proximal end of the well. The portion inside the perimeter of the opening 13 electrically contacts the conductive second fluid within the well. In FIG. 8C, the transparent conductive material forming the common electrode 81C extends radially inward over the perimeter of the opening 13 at the proximal end of the well. The portion inside the perimeter of the opening 13 electrically contacts the conductive second fluid within the well. In both of the examples of FIGS. 8B and 8C, a portion of the material forming the common electrode 81B or 81C extends outward from the perimeter of the opening 13 sufficient to allow the electrode to engage a suitable contact on or coupled to the flexible circuit board.

In the examples of FIGS. 8A to 8C, the optically active area of the cell encompasses the fluid-filled well. Hence, at least the portion of each electrode 81A to 81C that extends inside the perimeter of the opening 13 at the proximal end of the well is light transmissive, e.g. transparent. The examples discussed above assumed that the entirety of each electrode 81A to 81C was transparent, although portions of each electrode 81A to 81C outside the optically active area of the cell may be formed of other less transmissive conductors.

FIGS. 8A to 8C and the discussions thereof above, however, represent just a few examples of the common electrode and associated electrode formation techniques. Other structures may be used to form the common electrode, such as a pin through or a metal wire on the appropriate surface of the light transmissive plate 80. The common electrode need not be formed on or directly touching the light transmissive plate. For example, the electrode might extend through (and be encompassed by) the material of the flexible seal. In this later arrangement, an exposed portion of the electrode conductor would extend into the well from the flexible seal to contact one of the fluids.

Returning to the example depicted in the drawings, the light transmissive plate 80 is located in contact with the flexible seal 60 (FIGS. 9A to 9D), in such a manner that the light transmissive plate 80 covers the opening at the proximal end of the well and forms a contact seal with the flexible seal 60 around the opening at the proximal end of the well. FIG. 9B is a cross-sectional view of the cell 10 at this stage of the assembly process. FIG. 9C is an enlarged view corresponding to the circled section C-C of FIG. 9B; and FIG. 9D is an enlarged view corresponding to the circled section D-D of FIG. 9B.

The common electrode, on the light transmissive plate 80, contacts the second fluid 72 (see also FIG. 7). The example electrode 81A (FIG. 8A) represents an electrode arrangement intended to be readily connectable to the common electrode contact 56 of the flexible circuit board 50 (see also FIG. 5E). Although shown somewhat thick in FIGS. 9C and 9D to facilitate illustration, the electrode 81A may be sub-microns or thinner. Accordingly, the electrode 81A is omitted from later cross-sectional views.

A number of techniques may be used to connect the common electrode connector 56 on the surface of the flexible circuit board 50 to the common electrode 81A formed on the light transmissive plate 80. In the example of FIG. 9D, a portion of the flexible seal 60 along one outer edge may be notched out at 60*n*. The notch 60*n* provides an open space between the common electrode 81A on the glass or other type of light transmissive plate 8 and connector 56 for the common electrode on the flex circuit board 50. In this space, a piece 84 of solder is pressed between the electrode 81A and the common electrode contact 56 to make electrical contact. Another option (but not limited to) would be to melt a ball of solder onto the flex circuit prior to assembly, the solder ball would need sufficient height to contact the electrode on the glass during assembly. An alternate approach might involve adding a buildup of metal or extra electrode material on electrode 81A at a location that will be aligned with the notch 60*n*. In each such example, the conductor in the notch 60*n* provides electrical engagement and conductivity between the common electrode 81A and the common electrode contact 56 of the flexible circuit board 50. Other electrode arrangements like those of FIGS. 8B and 8C would be used with alternative arrangements of the common electrode contact on the flexible circuit board 50 and/or corresponding alternative arrangements for connections through to the assembly layer formed by the flexible seal 60.

At this stage of the example process 1 (after step S9 in FIG. 1), the fluids are sealed within the cell and the electrodes are formed and positioned to engage with contacts on the flexible circuit board. Several elements of the cell assembly, such as the flexible circuit board 50 and the seal 60, have openings around and/or aligned with the well, e.g. with the opening at the proximal end of the well, to allow passage of light through the optical area of the cell particularly the well. The cell may be complete, for example, if the elements of the cell are appropriately held in a manner sufficiently rigid to maintain the positional arrangement and the fluid tight seal of the well. The example, however, includes additional steps.

Figure 10A:
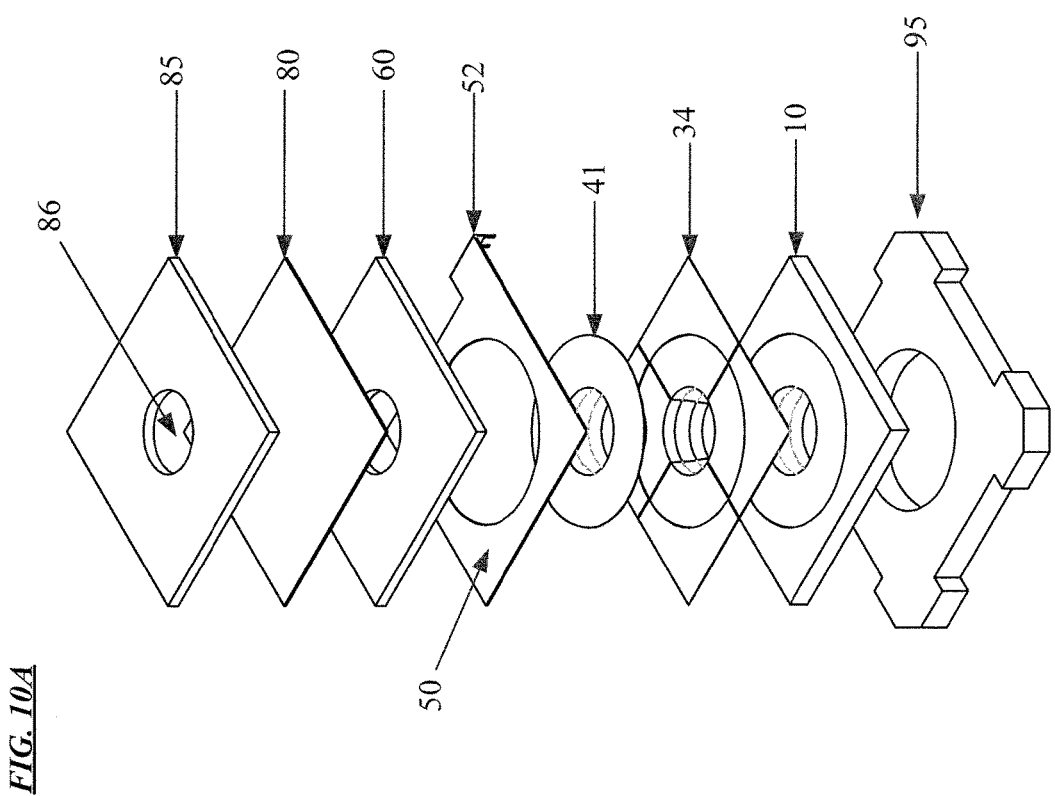
Figure 10B:
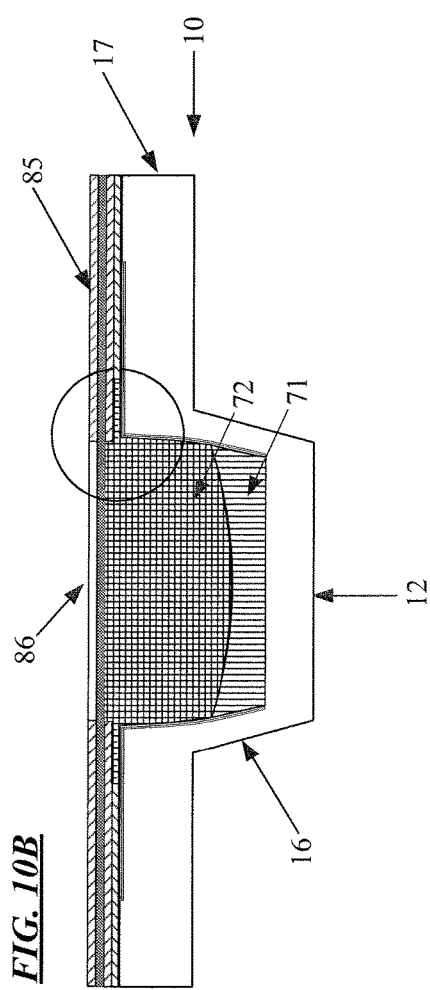
Figure 10C:
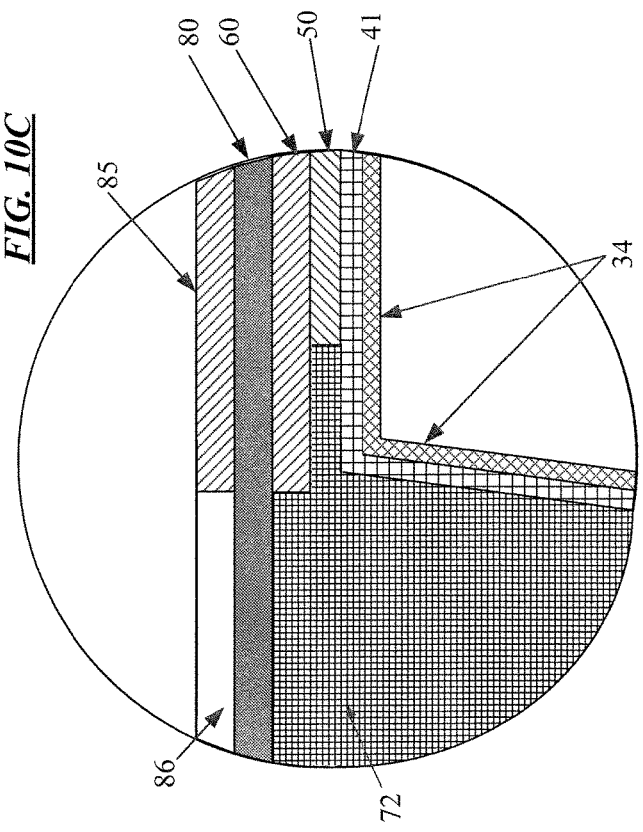

The next step (S10) involves installing a flexible membrane 85 over the light transmissive plate 80 (see the exploded, cross-sectional and enlarged views in FIGS. 10A to 10C). The flexible membrane 80 has an opening 86 which is aligned around the opening at the proximal end of the well, upon installation of the flexible membrane 85. The flexible membrane 85 provides a protective cushion for the glass implementation of the light transmissive plate 80. The combination of the flexible membrane 85 and the flat membrane implementation of the flexible seal 60 may also provide some degree of freedom of motion of the plate 80, e.g. to allow for expansion and/or contraction of the liquid container volume due to expansion or contraction of the fluids 71, 72 within the well due to temperature changes.

Figure 11A:
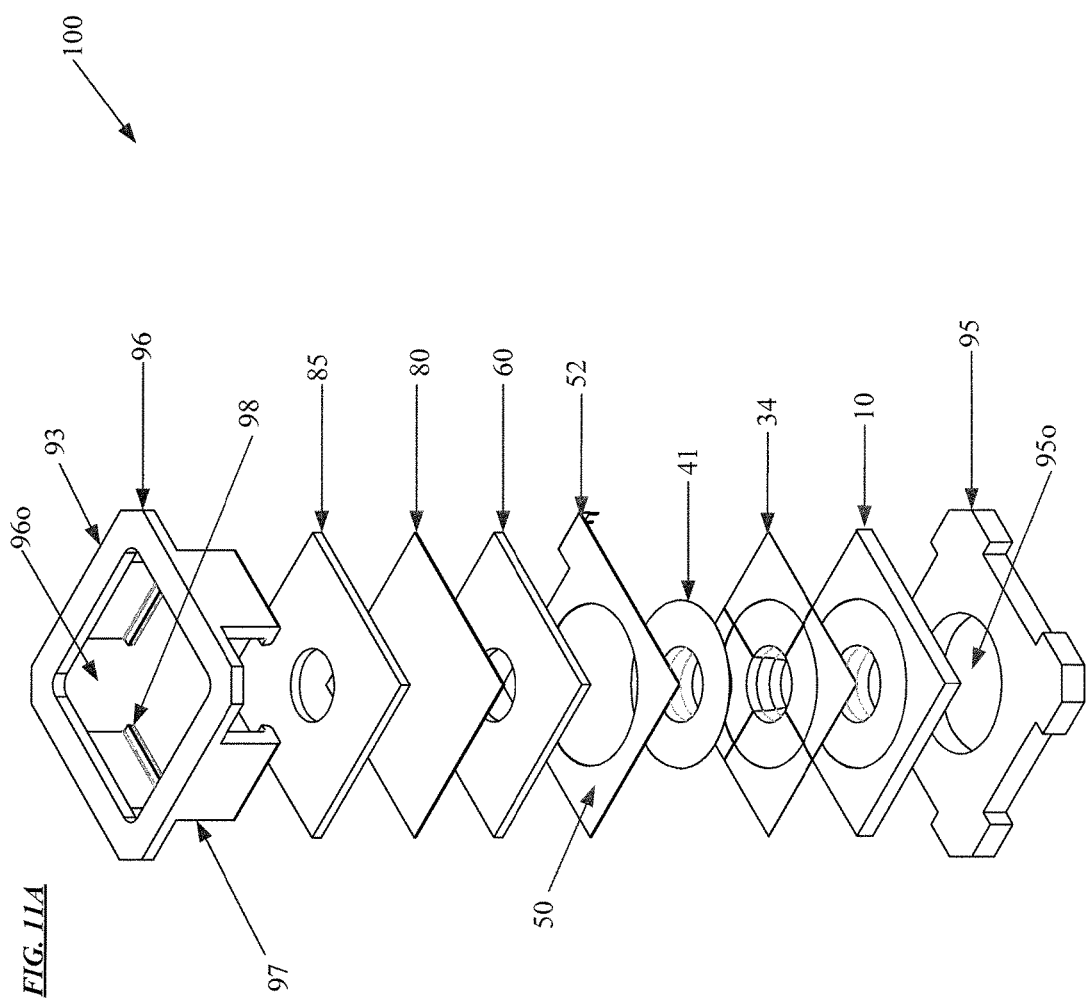
Figure 11B:
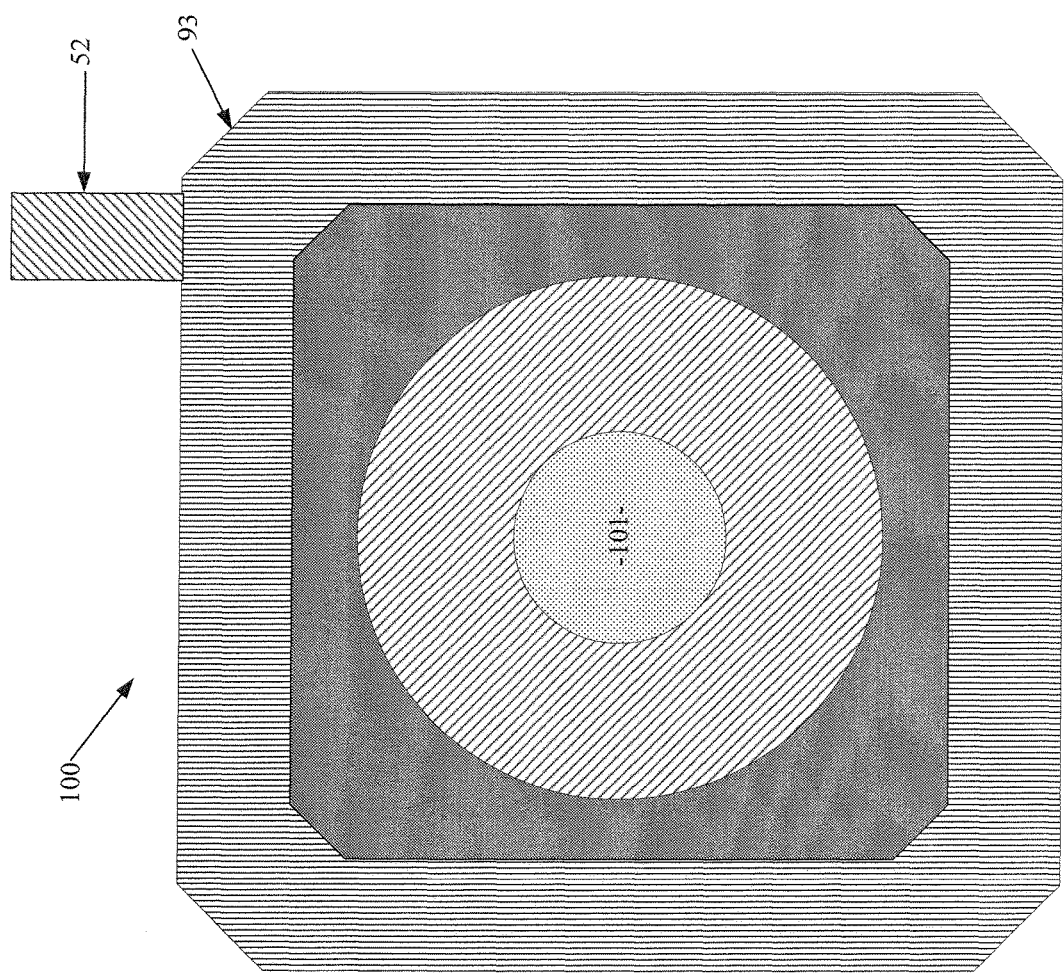

In the process flow example of FIG. 1, step S11 involves assembling two pieces of a clamp, to hold the components of the eletrowetting cell together in a unified assembly. FIG. 11A is an exploded view an example of the elements of the cell assembled through step S10 along with the separate pieces 93 and 95 of the clamp, whereas FIG. 11B is a plan view (of the top in the example orientation of FIG. 11A) that shows the assembled cell 100 with optically active area 101.

Figures 12A, 12B:
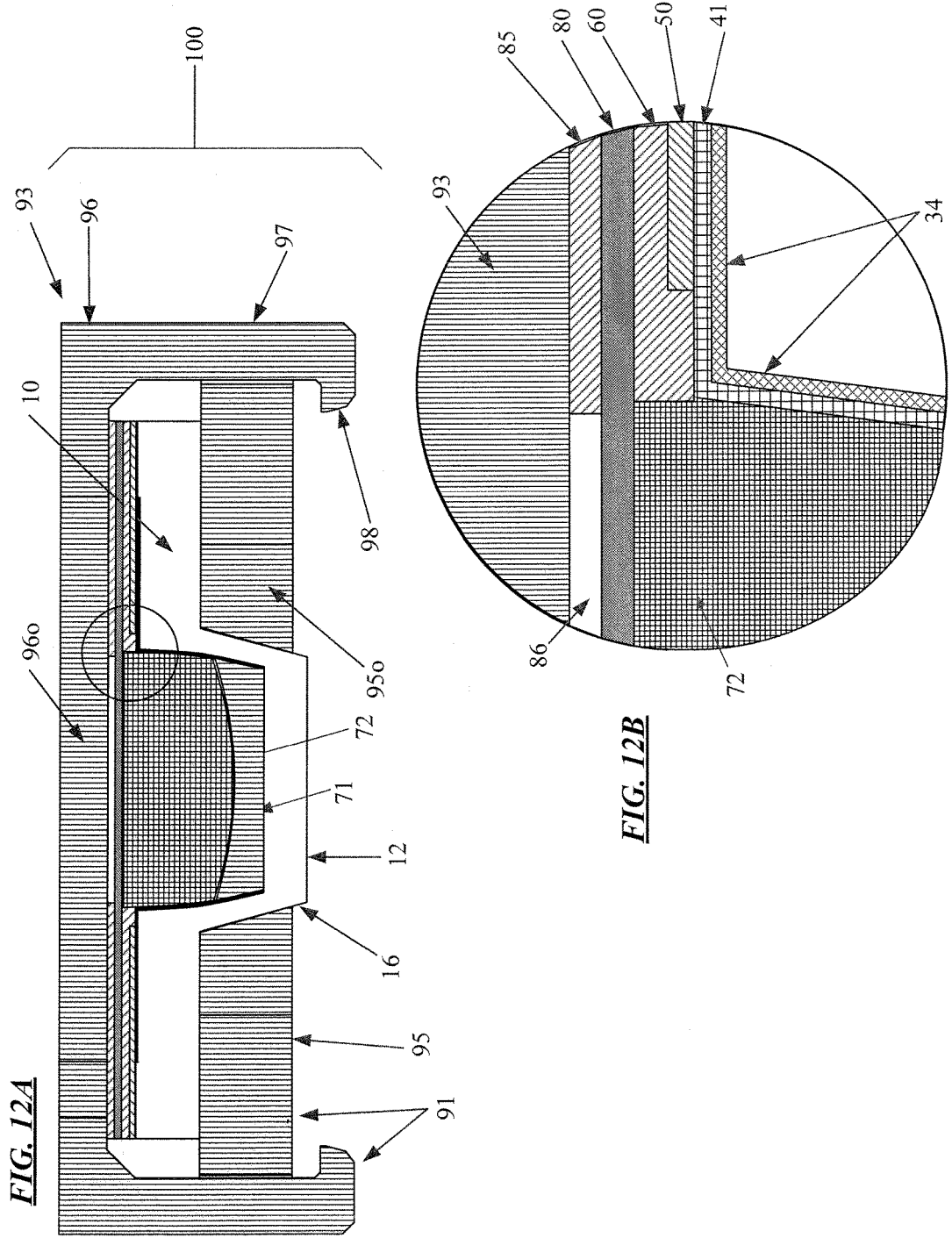

FIG. 12A is a cross-sectional view of the assembled cell 100, and FIG. 12B is an enlarged view corresponding to the circled area of the cross-section in FIG. 12A. In FIG. 12B, the flexible membrane seal 60 is shown with a wider portion filling the gap between the dielectric layer 41 and the facing surface of the flexible seal 60, in this case, running outward to the edge of the opening of the flexible circuit board 50. Several example of how this additional material may be provided to fill the gap and seal the circuit board 50 relative to the fluids. In n initial example, the clamp is applied in such a manner as to compress the flexible membrane seal 60. In the area inside the opening of the flexible circuit board 50 and between the dielectric layer 41 and the facing surface of the flexible seal 60, the clamp pressure pushes material of the flexible membrane seal 60 into the gap to fill the gap and provide the desired seal.

Of course, other approaches may be used. For example, additional seal material could be provided in this area between the seal and the dielectric, in the form of a boss or extension of the flexible seal 60 or in the form of an additional ring of a material the same as or similar to the material of the seal 60. In another alternative, if the flexible seal 60 is too thick, another approach might use an indent for the flat flexible membrane to compensate the thickness of the flexible circuit board 50. The example includes an indent in the glass cell, however, an extruded step in the glass plate (shown in later drawings) opposite to the indent might compensate the thickness of the for the thickness of the flexible circuit board 50.

The wider portion of the membrane seal 60 fits along the inner perimeter/opening of the flexible circuit board 50, in the gap between the light transmissive plate 80 and the dielectric layer 41, in the region between the inner perimeter/opening of the flexible circuit board 50 and the edge/opening of the dielectric layer 41 at the well.

As shown in FIGS. 11A and 12A, one piece 95 of a clamp 91 is assembled to engage the light transmissive member 10 in a region outside the well. In the example, the clamp piece 95 engages a surface of the shoulder section 17 of the light transmissive member 10 around the section 16 that contains the well and fluids. The other piece 93 of the clamp 91 engages the flexible membrane 85. When the clamp is applied, the gasket 60 should be compressed forming the seal around the flexible circuit board 50 that the conductive the second fluid 72 should not come in contact with the board or any of the contacts or leads on the board 50.

The pieces 93 and 95 of the clamp 91 may be formed of any suitable material, such as a suitably strong, relatively rigid plastic or an appropriate metal. The pieces 93 and 95 may be formed of the same or different materials. Although the pieces 93 and 95 could be transparent, in the example, the pieces 93 and 95 of the clamp 91 are not light transmissive although each has an opening around the optically active area 101.

The pieces 93 and 95 of the clamp 91 may be joined together by any suitable mechanism, such as bolts or screws extending between and coupled to the pieces 93 and 95. The example shown in FIGS. 11A to 12A uses a press-fit clip arrangement to join the clamp pieces 93, 95.

In the example, the clamp piece 93 has a body 96 that extends approximately along the perimeter of the cell assembly, e.g. around the periphery of the flexible membrane 85. The body 96 of the clamp piece 93 has an opening 96*o* (FIGS. 11A and 12A) around the well to avoid interference with light passing to and from the fluid well and/or any other part of the optically active area 101 of the cell 100. The other clamp piece 95 has an opening 95*o* (FIGS. 11A and 12A) around the section 16 of the light transmissive member that contains the well, to avoid interference with light passing to and from the fluid well and/or any other part of the optically active area 101 of the cell 100.

On a surface of the body 96 of clamp piece 93 facing toward the other clamp piece 95, the body 96 has legs 97 that extend from piece 93 toward the other clamp piece 95. The example in FIG. 11A includes one leg 97 on each lateral side section of the rounded square shaped body 96. Other numbers and/or placements of the legs may be used. A distal end of each leg 97 includes a detent 98 that extends laterally from the respective leg 97. There may be other numbers of legs and/or the legs/detents may extend through openings in the other clamp piece. In the example, the body of the clamp piece 95, the length of the legs 97 and the detents 98 are sized/configured so that the detents 98 engage a distal surface of the clamp piece 95 to lock the two pieces 93 and 95 of the clamp 91 together, with the other assembled elements of the electrowetting cell sandwiched between the pieces 93, 95 of the clamp 91. Also, the lengths of the legs 97 and positions of the detents 98 produce an interference fit such that the assembled clamp 91 compresses the sandwiched elements of the assembly, particularly the first membrane that forms the flexible seal 60 and the second flexible membrane 85. Compression of the flexible seal 60 insures sealing of the fluids within the well; and the compression of the flat flexible membrane seal 60 and the second flexible membrane 85 with the glass type light transmissive plate 80 therebetween supports the plate 80 between two flexible elements to allow motion of the plate 80.

The second flexible membrane 85 protects the light transmissive plate 80 (glass in the example) from any sharp points or edges on the clamp piece 93 and/or any uneven stress produced by the clamp 91. Depending on the thickness of the flexible seal (first membrane) 60 and the flexible second membrane 85, those two elements of the cell may form a bellows-like arrangement that allows the light transmissive plate 80 to float somewhat in response to changes in pressure produced by expansion and contraction of fluid(s) in the well due to changes in operating temperature of the cell.

FIG. 12A is a cross sectional view of the electrowetting cell 100 produced by the method of FIG. 1; and FIG. 12B is an enlarged cross sectional view of a section of the electrowetting cell 100. Earlier FIG. 11A provides an exploded isometric view of the cell as assembled through step S11.

As shown in FIGS. 11A, 12A and 12B, an example of the electrowetting cell 100 includes a light transmissive member 10. The member 10 has a well 11 (FIGS. 2A, 2B) with a sealed distal end 12 and an opening at proximal end of the well. The light transmissive member 10 also includes an electrode landing zone around the opening at the proximal end of the well. The light transmissive member 10, for example, may be a single, solid glass element having a cylindrical or tapered section 16 and a surrounding shoulder section 17. The tapered section 16 includes most of the well. The opening 14 at the proximal end 13 of the well 11 is formed through the shoulder section 17 (see FIGS. 2A, 2B); and the proximal surface of the shoulder section 17 of the light transmissive member 10 forms the electrode landing zone.

The electrowetting cell 100 also includes control channel electrodes that are electrically isolated from each other. Each control channel electrode includes a first part 37 located on a respective portion of an interior wall surface of the well and a second part 38 located on a respective portion of the electrode landing zone (see FIGS. 3C to 3E).

A dielectric layer 41 includes a first portion 42 covering the first parts of the control channel electrodes on the portions of the interior wall surface of the well and a second portion 43 covering some but not all of the second parts of the control channel electrodes on portions of the electrode landing zone (see FIGS. 4A to 4D). In an example, the dielectric 41 also is hydrophobic.

A flexible circuit board 50 extends over the second parts of the control channel electrodes on the electrode landing zone. A surface of the flexible circuit board 50 facing the electrodes includes electrical contacts 51 isolated from each other (see FIG. 5D). Each electrical contact 51 is located on the flexible circuit board 50 to contact a part of a respective control channel electrode not covered by the dielectric layer. The flexible circuit board 50 may also carry a contact 56 on an opposite surface for electrical engagement with a common electrode of the cell 100 (see FIGS. 5E and 8A).

A flexible seal extends over the flexible circuit board and the second portion of the dielectric layer. In the example, seal 60 is formed as a flat membrane of an appropriate flexible/compressible material. The flexible seal 60 has an opening aligned around the opening at the proximal end of the well. The electrowetting cell 100 also includes two fluids 71, 72 in the well. A first fluid 71 is located at the sealed distal end of the well, e.g. in contact with a portion 44 (FIG. 4B) of the dielectric layer 41. The first fluid 71 in the example is relatively non-conductive. The second fluid 72 fills the remainder of the well to the opening at the proximal end of the well. The second fluid is relatively conductive, in the example. The first and second fluids 71, 72 in these examples are immiscible with respect to each other and may have different optical properties (e.g. difference indices of refraction).

The electrowetting cell 100 also includes a light transmissive plate 80 and a common electrode on at least a portion of the light transmissive plate 80. The light transmissive plate 80 is located in contact with the flexible seal. The light transmissive plate 80 covers the opening at the proximal end of the well and covers at least a substantial portion of the flexible seal 60 around the opening at the proximal end of the well. The common electrode on the light transmissive plate 80 contacts the second fluid 72. In this arrangement, the control channel electrodes for of material 34 do not contact fluid. The dielectric layer 41 separates the channel electrodes 35a to 35d from the fluids 71, 72. For example, dielectric layer 41 may provide both physical isolation and electrical insulation, between the fluids 71, 72 and the control channel electrodes 35a to 35d.

The illustrated example of the electrowetting cell 100 also includes a flexible membrane 85 located in contact with the light transmissive plate 80. The flexible membrane 85 has an opening aligned around the opening at the proximal end of the well.

The example electrowetting cell 100 also includes a two-piece clamp 91, to hold the components of the eletrowetting cell 100 together in a unified assembly. One piece 95 of the clamp 91 engages the light transmissive member 10 in a region outside the well, e.g. a portion of the distal surface of shoulder 17; and the other piece 93 of the clamp 91 engages the flexible membrane 85.

The openings 95o, 96o through the two pieces 95, 93 of the clamp 91 are shown as relatively large, by way of example only in the drawings. Other sizes of openings may be used. The openings may be only sufficiently large to allow passage of light to/through/from the active area of the cell 100, e.g. the well containing the fluids 71, 72. A size closer to the size of the well opening and the extension 16 containing the well provides more area of the clamp pieces that can be in contact with the membrane 85 and the distal surface of the shoulder section 17 of the light transmissive member 10, to more evenly distribute the forces of the pressure fit of the clamp 91.

The example electrowetting cell structures are suitable for large format light processing applications, for example, for general illumination or the like. For such applications, the active optical area (e.g. the diameter the opening 13 at a proximal end 14 of the well 11) of the electrowetting cell 100 may have a diameter in a range of 8 mm to 10 mm or may be even larger. The example utilized a round well configuration, which defined a circular active optical area. It should be appreciated that the well may have other shapes and/or the resulting active optical area may have other shapes (e.g. polygonal shapes, such as triangular, square or rectangular, hexagonal, octagonal, etc.). The example of the well has a tapered inner wall, although there can be different angles of the inner wall(s). Different shapes of the active optical area, in turn, may result in different dimensions. For example, a square configuration may have dimensions of 8 mm×8 mm (64 mm$^2$) or larger for the active optical area. Of course, the cell structure may be adapted to smaller or larger sizes, for particular applications.

The cell 100 includes a flexible circuit board 50 providing contacts and leads/traces for electrical connections to the electrodes of the cell. Electrical access to that circuitry on the flexible circuit board 50 is via contacts on the tail 52 of the circuit board 50. Depending on the particular application, a single cell 100 may be used, or a number of such cells arranged in a line or a multi-row-multi-column matrix may be utilized.

Figure 13:
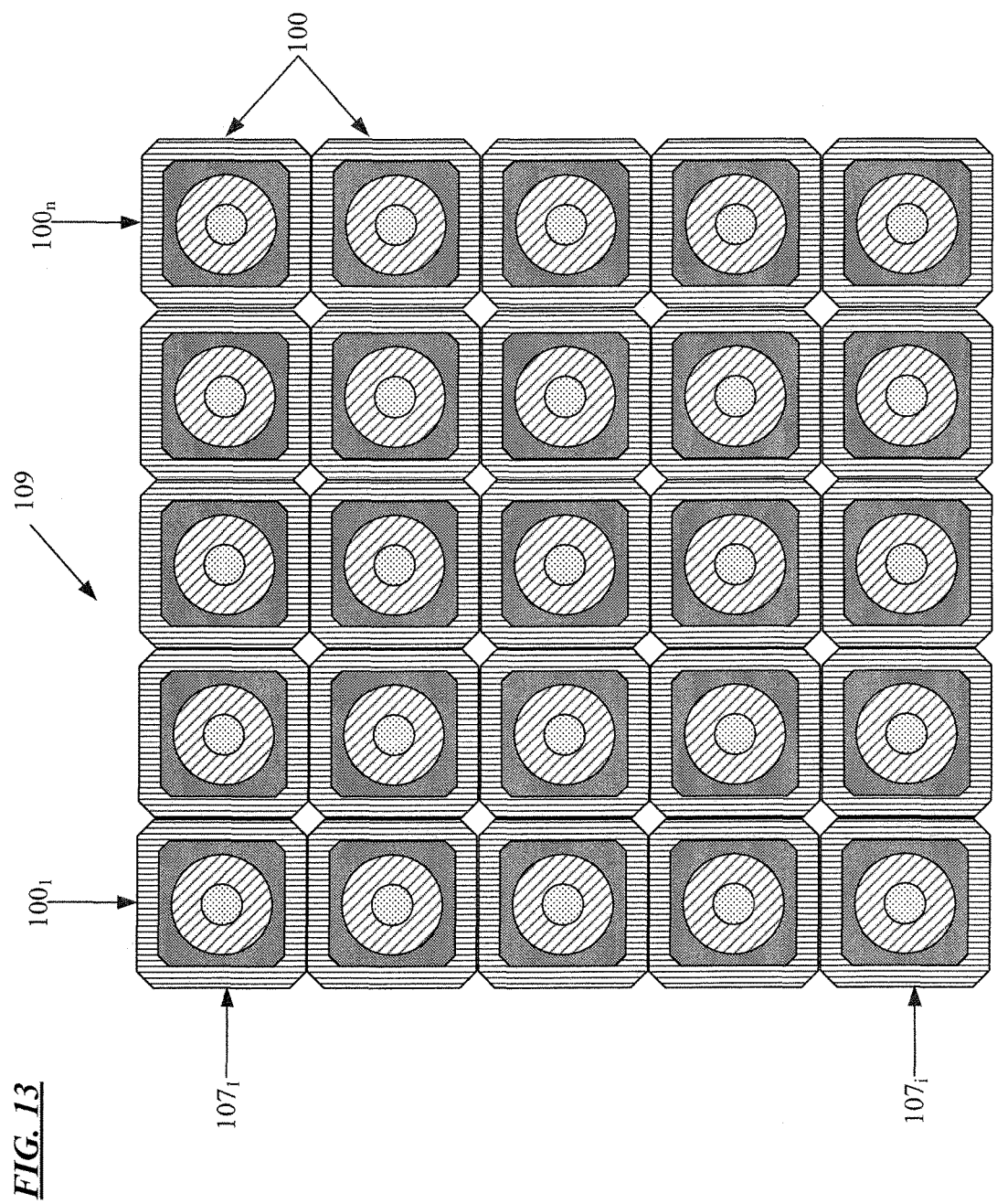
FIG. 13 depicts an assembly of electrowetting cells forming a row-and-column matrix for an array of electrowetting cells.

FIG. 13, for example, depicts assembly of a number of rows 107$_1$ to 107$_i$ of electrowetting cells 100 to form an array 109. Each of the i rows 107$_1$ to 107$_i$ includes a number n of cells 100$_1$ to 100$_n$. In this manner, the cells form an i×n row-and-column matrix for the array 109 of electrowetting cells 100. Although not shown, suitable leads would connect to the tails 52 of the various cells 100 to 100n of the rows 107$_1$ to 107$_i$ forming the array 109. For example, the leads may form a bus system connecting all of the cells of the array in common, e.g. to a single driver circuit and associated controller. In such an electrical arrangement all of the i×n electrowetting cells 100 would be controlled in common. Various other connection arrangements may be used, e.g. to control each cell independently with connections to a separate driver for each cell of the matrix, to control each row independently with connection of each row to a separate driver, or to control various sub-matrices of the array independent of each other (but with all of the cells in a given sub-matrix connected together and commonly controlled) with a separate driver connected to each sub-matrix.

In the example, the driver is separate from the cell(s) driven by the respective driver. Alternatively, the driver(s) may be more closely associated with respective cell(s). For example, some or all of the driver circuitry for a particular cell might be implemented on the flexible circuit board of the cell.

Figure 14:
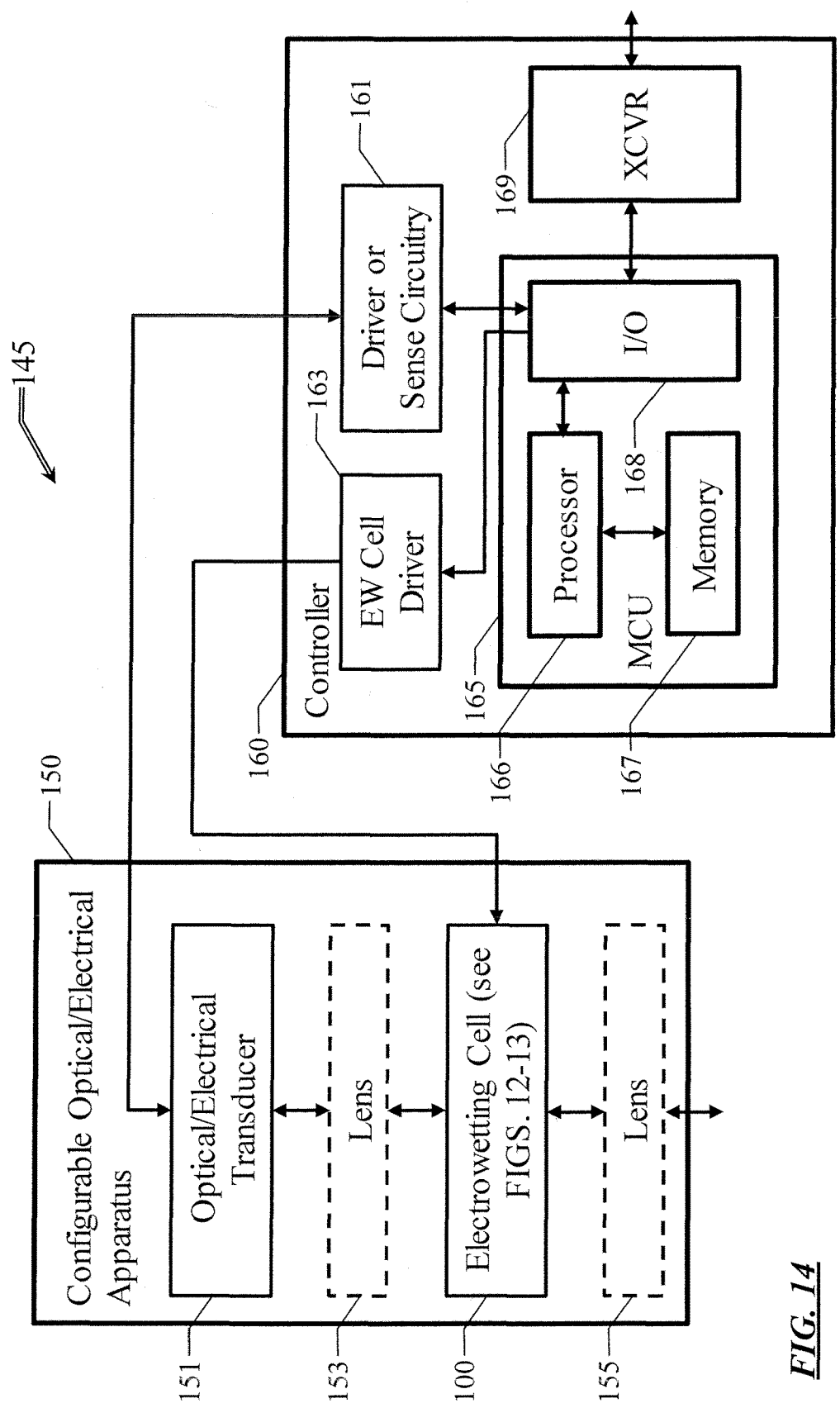
FIG. 14 is a simplified functional block diagram of a system combining an electrowetting cell like that of FIG. 11A to 12A with an optical/electrical transducer and associated circuitry.

FIG. 14 is a simplified functional block diagram of a system 145, which includes a configurable optical/electrical apparatus 150 and a controller 160. The configurable optical/electrical apparatus 150 combines an electrowetting cell 100 like that of FIG. 12A with an optical/electrical transducer 151. Although associated circuitry may be provided in the apparatus 150, the example shows circuitry in the controller 160, which may be somewhat separate from or even remote from the configurable optical/electrical apparatus 150.

An optical/electrical transducer 151 is a device that converts between forms of optical and electrical energy, for example, from optical energy to an electrical signal or from electrical energy to an optical output. Examples of optical-to-electrical transducers include various sensors or detectors, photovoltaic devices and the like. Optical-to-electrical transducers discussed herein are responsive to light, and the light may be visible light, ultraviolet light, infrared, near infrared or light in other portions of the optical spectrum.

Examples of electrical-to-optical transducers include various light emitters, although the emitted light may be in the visible spectrum or in other wavelength ranges. Suitable light generation sources for use as the transducer 151 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the transducer 151.

When optical transducer 151 is a light source, the light source may use a single emitter to generate light or may combine light from some number of emitters that generate the light. A lamp or 'light bulb' is an example of a single source. An LED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer 151 may or may not be pixelated for control purposes. The electrowetting cell 100 is controlled to selectively optically change or spatially (optically) modulate the light distribution output from the transducer and thus from the apparatus 150. The electrowetting cell 100 may support controlled beam steering, controlled beam shaping or a combination of controlled beam steering and shaping.

In another example, optical transducer 151 is an optical-to-electrical converter, that is to say, a light sensor or detector or a photovoltaic device. The overall apparatus 150 in such a case may be configured as an imager, other light responsive sensor, light responsive power source, or the like. The light detector may be an array of light detectors, a photo-detector such as a photodiode, or a photovoltaic device, depending on the desired function of optical/electrical apparatus 150. Other suitable light detectors for use as optical/electrical transducer 151 include charge-coupled device (CCD) arrays, complementary metal-oxide-semiconductor (CMOS) arrays, photomultipliers, image intensifiers, phototransistors, photo resistors, thermal imagers, and micro-electromechanical systems (MEMS) imagers. Nonetheless, virtually any detector of light may be used as the transducer 151 in an optical-to-electrical arrangement of apparatus 160. Suitable light detectors will be known to one of ordinary skill in the art from the description herein. The electrowetting cell 100 is controlled to selectively optically change or spatially (optically) modulate the field of view of light coming into the apparatus 150 for delivery to transducer 151. The electrowetting cell 100 may support controlled beam steering, controlled beam shaping or a combination of controlled beam steering and shaping, with respect to light from a field of intended view for the particular optical-to-electrical application of the apparatus 150.

While light source examples and light detector examples are described separately, it will be understood that both types of optical/electrical transducers 151 may be present in a single optical apparatus 150 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern.

In an overall apparatus 150, with an optical/electrical transducer 151, the electrowetting cell 100 may have a lens on one side or the other side or have lenses on both sides, of the electrowetting cell 100, along the axis of the optical path through the cell 100 and to or from the transducer 151. Hence, FIG. 14 shows a dotted line (optional) example of a lens 153 between the transducer 151 and the electrowetting cell 100. Similarly, FIG. 14 shows a dotted line (optional) example of a lens 155 on the side of the electrowetting cell 100 opposite the transducer 151. In the example, the lenses 151 or 153 would be fixed lenses.

Various examples of arrangements of a spatial optical modulator (e.g. as an electrowetting cell) with one or more cascaded lenses are disclosed in U.S. patent application Ser. No. 15/228,414, filed Aug. 4, 2016, entitled "Configurable Optical Transducers Using An Optical Modulator And One Or More Lenses," the disclosure of which is entirely incorporated by reference.

Although not shown, additional optical processing elements may be provided in the apparatus 150. In a luminaire for general illumination or in another type of light emission device (e.g. a flash), an emitter type transducer 151 may be coupled to the electrowetting lens 100 via a collimating optic, such as a total internal reflection (TIR) lens.

A transducer 151, such as a light emitter or a light detector, often connects to corresponding electrical circuitry to operate the particular type of transducer, e.g. a driver circuit to supply power to an emitter or a sense circuit to process an output signal from a detector (and provide power to the detector if necessary). Hence, to operate the transducer 151, the controller 160 includes corresponding driver or sense circuitry 161. The type of circuitry 161 would depend on the type of transducer 151.

The controller 160 includes an electrowetting (EW) driver 163 to selectively provide signals to the electrodes (e.g. voltages between respective control channel electrodes and the common electrode) to control the fluid state of the electrowetting cell 100. The driver 163, for example, may be circuitry constructed/configured to apply direct current (DC) voltages or alternating current (AC) voltages or AC with a DC offset to the cell electrodes. In the example 100 of the cell above, having four control channel electrodes and a common electrode, the EW driver 163 would have four separately controllable voltage output channels each having a connection through a respective contact to a respective one of the control channel electrodes. Each separately controllable voltage output channel of the EW driver 163 would also have a connection through the common contact to the common electrode of the electrowetting cell 100. Configuration of the circuitry of the EW driver 163 would be adapted to the particular electrical control strategy (e.g. to use AC, DC or a combination of AC and DC), the intended range(s) of fluid states and thus to the beam steering and/or shaping capabilities of the electrowetting cell 100, and/or to any voltage or current limitations intended to minimize damage to the cell structure of components thereof during operation of the system 145.

The controller 160 also includes a processor, one or more digital storage media, data and programming in the storage and appropriate input/output circuitry. Although other processor based architectures may be used (another example is described later regarding FIG. 15), the example of controller 160 utilizes a Micro-Control Unit (MCU) 165, which implements the control logic for the controller 160 and thus of the system 145. For example, the MCU 165 implements the logic for control of operations of the associated optical/electrical apparatus 150. Although shown as controlling only one such apparatus 150, the MCU and controller may control a number of such apparatuses 150.

The MCU 165 may be a microchip device that incorporates a processor 166 serving as the programmable central processing unit (CPU) of the MCU 165 as well as one or more memories, represented by memory 167 in the drawing. The memory 167 is accessible to the processor 166, and the memory or memories 167 store executable programming for the CPU formed by processor 166 as well as data for processing by or resulting from processing of the processor 166. The MCU 165 may be thought of as a small computer or computer like device formed on a single chip. Such devices are often used as the configurable control elements embedded in special purpose devices rather than in a computer or other general purpose device. A variety of available MCU chips, for example, may be used as the MCU 165 in the controller 160 of system 145.

The MCU 165 in this example also includes various input and output (I/O) interfaces, shown collectively by way of example as interface 168 in FIG. 14. The I/O interfaces 168, for example, support a control output to the EW cell driver 163 as well as a control output and/or input to the driver or sense control circuitry 161 (for the optical/electrical transducer 151). The I/O interfaces 168 also support input/output communications with one or more electronic devices, which may be connected to or incorporated in the system 145 (e.g. to provide a user interface not shown) or which may be remote.

In the illustrated example, the controller 160 also includes a communication transceiver (XCVR) 169 coupled to the processor 166 (and possibly to the memory 167) via an I/O output interface 168 of the MCU 165. Although shown separately, the transceiver 169 may be implemented in circuitry on the same chip as the elements of the MCU 165. Although the drawing shows only one transceiver 169, controller 160 may include any number of transceivers, for example, to support additional communication protocols and/or provide communication over different communication media or channels.

The transceiver 169 supports communication with other control or processing equipment, for example, with a remote user interface device and/or with a host computer of a building control and automation system (BCAS). The transceiver 169 may also support system communication with a variety of other equipment of other parties having access to the system 145 in an overall/networked system encompassing a number of similar systems 145, e.g. for access to each system 145 by equipment of a manufacturer for maintenance or access to an on-line server for downloading of programming instructions or configuration data for setting aspects of sensing or lighting operation of the associated optical/electrical apparatus(s) 150. The circuitry of the transceiver 169 may support such communication(s) over any available medium, such as wire(s), cable, optical fiber, free-space optical link or radio frequency (RF) link.

Figure 15:
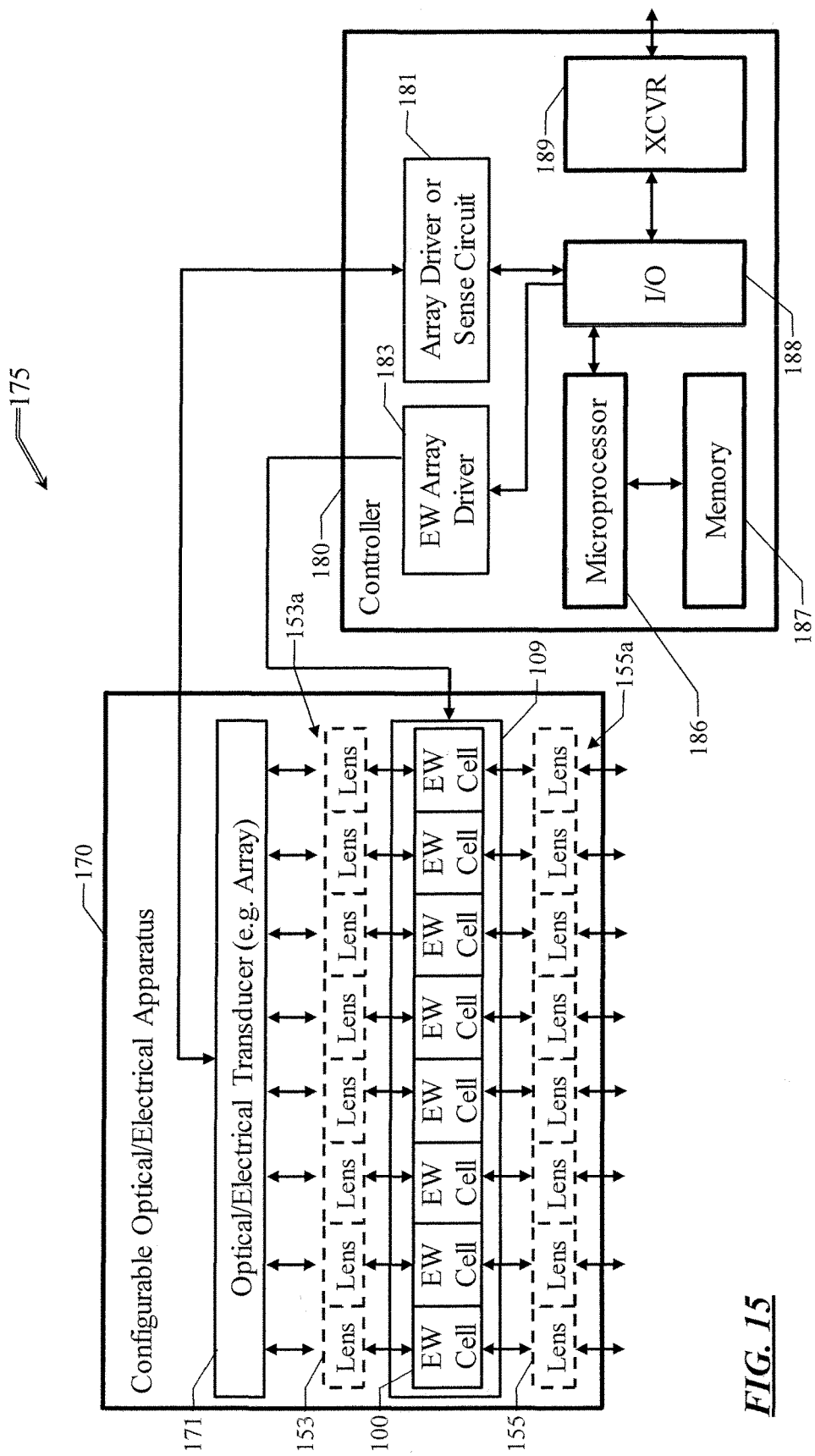
FIG. 15 is a simplified functional block diagram of a system combining an electrowetting cell array like that of FIG. 13 with one or more optical/electrical transducers and associated circuitry.

FIG. 15 is a simplified functional block diagram of a system 175 combining an electrowetting cell array 109 like that of FIG. 13 with one or more optical/electrical transducers 171 (combined in a configurable optical/electrical apparatus 170). The drawing also depicts an example of associated circuitry, which is implemented in a controller 180. The electrowetting cellular array 109 is used to provide selectively controllable beam steering and/or beam shaping for any of a variety of types of optical/electrical transducers 171, including both light detectors and light emitters. The controller 180 may be included in the apparatus 170, or the controller 180 may be somewhat separate from or even remote from the configurable optical/electrical apparatus 170.

The optical/electrical transducer 171 may be any transducer device of the types discussed above, although the transducer 171 is configured to operate with an array 109 of electrowetting cells 100. Although the transducer 171 may be a single device, e.g. a single relatively large light source, in many examples, transducer 171 is an array of emitters and/or lighting input responsive devices (e.g. detectors or photovoltaic devices). In a luminaire example using the apparatus 170, the transducer 171 might include an array of high intensity LED light emitters, where each one of the emitters is coupled to one or more of the cells 100 of the array 109. In a detector example using the apparatus 170, the transducer 171 might include a complementary metal-oxide-semiconductor (CMOS) image sensor, a charge-coupled device (CCD) image sensor or other image detector array like any of those used in digital cameras. Each actual detector at a pixel of the image sensor array could be coupled to one or more of the cells 100 of the array 109.

In an apparatus 170, with an optical/electrical transducer 171, the electrowetting cell array 109 may have one or more lenses on one side or the other side or have lenses on both sides, of the electrowetting cell array 109, along the axis of the optical path through the cell array 109 and to or from the transducer 171. Although there may be more or fewer lenses than there are cells 100 in the array 109, we will consider lens array arrangements, e.g. in which a lens array 153a or 155a has a lens 153 or 155 coupled to each cell 100 of the array 109. Hence, FIG. 15 shows a dotted line (optional) example of a lens array 153a between the transducer 171 and the electrowetting cell array 109. Similarly, FIG. 15 shows a dotted line (optional) example of a lens array 155a on the side of the electrowetting cell array 109 opposite the transducer 171. In the example, the lenses 151 or 153 would be fixed lenses.

Although the array structure(s) are different, various examples of arrangements of a controllable electrowetting array with one or more cascaded lenses are disclosed in U.S. patent application Ser. No. 15/389,829, filed Dec. 23, 2016, entitled "Electrowetting Cellular Array And Luminaire Incorporating The Array," the disclosure of which is entirely incorporated by reference.

Although not shown, additional optical processing elements may be provided in the apparatus 170. In a luminaire for general illumination or in another type of light emission device (e.g. a flash), each emitter type transducer in an array implementation of the transducer 171 may be coupled to one or more of the electrowetting lenses 100 of array 109 via a collimating optic, such as a total internal reflection (TIR) lens.

A transducer 171, such as a light emitter or a light detector, often connects to corresponding electrical circuitry to operate the particular type of transducer, e.g. a driver circuit array to supply power to each emitter of an emitter array or sense circuitry to process output signals from the detectors (and provide power to the detectors if/when necessary). Hence, to operate the transducer 171, the controller 180 includes corresponding an array driver or sense circuit 181. The type of circuitry 181 would depend on the type of transducer 171, e.g. the particular array of emitters of a display or multi-pixel luminaire type source or the particular type of image sensor array.

The controller 180 includes an electrowetting (EW) driver 183 to selectively provide signals to the electrodes (e.g. voltages between respective control channel electrodes and the common electrode) to control the fluid state of each electrowetting cell 100 of the array 109. As outlined earlier, the driver 183 may be connected to control all of the cells 100 as a single group, as some number of sub-groups (e.g. lines or sub-matrices), or as individual controllable optics.

The driver 183, for example, may include circuitry constructed/configured to apply direct current (DC) voltages or alternating current (AC) voltages or AC with a DC offset to electrodes of each cell or in common to the electrodes of some number of the cells of the array 109. If all cells are controlled in common, the circuitry of the driver 183 may be similar to that of the driver 163 discussed above, although driver 183 may have a higher power capacity to drive more cells in common. If cells are controlled individually, the driver 183 may include circuitry of a driver similar to that of the driver 163 discussed above, for each cell 100 of the array 109 or multiplexing circuitry to supply drive signals to the various cells from one or a small number of individual drivers (e.g. on a sequential basis). In a system implementation where sets of one or more lines or sub-matrix groups of cells are controlled in common, the driver 183 may include circuitry of a driver similar to that of the driver 163 discussed above, for each group of cells 100 of the array 109 that are to be commonly controlled. The separate drivers in this later implementation, however, would allow independent control of the different groups of cells within the array 109. Multiplexing may also be used to independently drive the various groups of cells 100.

The controller 180 also includes a processor, which in this example, is implemented by a microprocessor 186. The microprocessor 186 is programmed to implement control and other processing functions of a central processing unit (CPU) of the controller 180. The microprocessor 186, for example, may be based on any known or available microprocessor architecture, such as a Reduced Instruction Set Computing (RISC) using ARM architecture, as commonly used today in mobile devices and other portable electronic devices. Of course, other microprocessor circuitry may be used to form the CPU of the controller 180. Although the illustrated example includes only one microprocessor 186, for convenience, a controller 180 may use a multi-processor architecture.

The controller 180 also includes one or more digital storage media, represented by the memory 187, for storage of data and programming. The storage media represented by the memory 187 may include volatile and/or non-volatile semiconductor memory, any suitable type of magnetic or optical storage media, etc. The microprocessor 186 implements the control logic for the controller 180 and thus of the system 175, based on executable instructions of the programming, which in the example is stored in the memory 187. The executable instructions may be firmware or software instructions, to configure the microprocessor 186 to perform electrowetting control operations, lighting control operations or light detection operations, etc. Based on execution of the program instructions, the microprocessor 186, for example, implements the logic for control of operations of the transducer 171 and the cellular electrowetting array 109, in the associated optical/electrical apparatus 170. Although shown as controlling only one such apparatus 170, the microprocessor 186 and thus the controller 180 may control a number of such apparatuses 170.

Although shown in simplified block form, the architecture of controller 180 may be similar to that of any of a variety of types of types of other smart electronic devices, such as an architecture for a personal computer or an architecture for a mobile terminal device.

The processor 166 of the MCU 165 (FIG. 14) and the microprocessor 186 (FIG. 15) are examples of processors that may be used to control an electrowetting cell or array of such cell and control or respond to outputs of any associated optical/electrical transducer(s). As used herein, a processor is a hardware circuit having elements structured and arranged to perform one or more processing functions, typically various data processing functions. Although discrete logic components could be used, the examples utilize components forming a programmable central processing unit (CPU). A processor for example includes or is part of one or more integrated circuit (IC) chips incorporating the electronic elements to perform the functions of the CPU.

The processor 166 or the microprocessor 186 executes programming or instructions to configure the system 145 or 175 to perform various operations. For example, such operations may include various general operations (e.g., a clock function, recording and logging operational status and/or failure information) as well as various system-specific operations (e.g. controlling beam steering and beam shaping of input or output light, operation of the transducer(s) and the like) of an optical/electrical apparatus 160 or 180 incorporating one or more of the electrowetting cells and associated transducer(s). Although a processor may be configured by use of hardwired logic, typical processors in lighting devices are general processing circuits configured by execution of programming, e.g. instructions and any associated setting data from the memories shown or from other included storage media and/or received from remote storage media.

As outlined above, a class of applications of the cell 100 with suitable light source type transducers provide configurable luminaires. The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

Artificial light output from a luminaire may carry information, such as a code (e.g. to identify the luminaire or its location) or downstream transmission of communication signaling and/or user data. The light based data transmission may involve modulation or otherwise adjusting parameters (e.g. intensity, color characteristic or optical spatial distribution) of the illumination light output from the device.

Another class of applications for the electrowetting cell relate to sensing applications. A sensing application typically combines a detector type transducer with one or more electrowetting. The detector, for example, may be a single light responsive component, a combination of several light responsive components detecting the same or different light characteristics, or a pixel array of light detectors (e.g. for image sensing). Although some photovoltaic devices may output power in response to optical energy, sensors typically involve some processing circuitry to operate the particular type of detector.

Displays and a variety of other applications of the electrowetting cell also are within the scope of the disclosure above.

The examples shown and described above relate to a light transmissive electrowetting cell, that is to say a cell that acts as a lens and/or prism and is relatively transparent with respect to light that passes entirely through the optically active area of the cell. Teachings herein may also relate to reflective eletrowetting cells. For a reflective cell, a reflector could either be at one end of the well (distal end 12 or the glass plate covering the opening 13) or at the meniscus forming the interface of the two fluids. Alternatively, one of the liquids could be reflective, in which case that liquid itself could be used as reflector without adding any extra reflector.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method, comprising steps of:
   preparing a light transmissive member including: a well having a sealed distal end, an opening at a proximal end of the well, and an electrode landing zone around the opening at the proximal end of the well;
   forming control channel electrodes electrically isolated from each other on the light transmissive member, each control channel electrode comprising a first part formed on a respective portion of an interior wall surface of the well and a second part formed on a respective portion of the electrode landing zone;
   forming a dielectric layer including a first portion covering the first parts of the control channel electrodes on the portions of the interior wall surface of the well and a second portion covering some but not all of the second parts of the control channel electrodes on portions of the electrode landing zone;
   installing a flexible circuit board over at least some of the second parts of the control channel electrodes on the electrode landing zone, wherein a surface of the flexible circuit board facing the electrodes includes electrical contacts isolated from each other, each electrical contact being located on the flexible circuit board to contact a part of a respective control channel electrode not covered by the dielectric layer;
   installing a flexible seal on the second portion of the dielectric layer, the flexible seal surrounding and having an opening aligned around the proximal end of the well;
   installing first and second fluids in the well such that the first fluid is at the sealed distal end of the well and the second fluid fills a remainder of the well to the opening at the proximal end of the well, wherein: the first fluid is relatively non-conductive, the second fluid is relatively conductive, and the first and second fluids are immiscible with respect to each other;
   forming a common electrode on at least a portion of a light transmissive plate; and
   installing the light transmissive plate over the flexible seal, in such a manner that:
      the light transmissive plate covers the opening at the proximal end of the well,
      the light transmissive plate forms a contact seal with the flexible seal around the opening at the proximal end of the well, and
      the common electrode contacts the second fluid.

2. The method of claim 1, wherein the step of forming control channel electrodes comprises:
   applying a shadow mask to regions of the light transmissive member intended to be free of control channel electrode material;
   depositing electrode material on regions of the light transmissive member not covered by the shadow mask; and
   removing the shadow mask.

3. The method of claim 1, wherein the step of forming control channel electrodes forms at least four control channel electrodes.

4. The method of claim 1, wherein, in the step of installing the flexible seal, the flexible seal is a first flat flexible membrane installed to extend over the flexible circuit board and over the second portion of the dielectric layer.

5. The method of claim 1, further comprising a step of installing a second flexible membrane over the light transmissive plate, the second flexible membrane having an opening which is aligned around the opening at the proximal end of the well upon installation of the flexible membrane.

6. The method of claim 5, further comprising a step of assembling two pieces of a clamp, in an arrangement in which:
   one piece of the clamp engages the light transmissive member in a region outside the well, and
   the other piece of the clamp engages the second flexible membrane.

7. An electrowetting cell, comprising:
   a light transmissive member including: a well having a sealed distal end, an opening at proximal end of the well, and an electrode landing zone around the opening at the proximal end of the well;
   control channel electrodes electrically isolated from each other, each control channel electrode comprising a first part located on a respective portion of an interior wall surface of the well and a second part located on a respective portion of the electrode landing zone;
   a dielectric layer including a first portion covering the first parts of the control channel electrodes on the portions of the interior wall surface of the well and a second portion covering some but not all of the second parts of the control channel electrodes on portions of the electrode landing zone;

a flexible circuit board extending over at least some of the second parts of the control channel electrodes on the electrode landing zone, wherein a surface of the flexible circuit board facing the electrodes includes electrical contacts isolated from each other, each electrical contact being located on the flexible circuit board to contact a part of a respective control channel electrode not covered by the dielectric layer;

a flexible seal on the second portion of the dielectric layer, the flexible seal surrounding and having an opening aligned around the proximal end of the well;

a first fluid in the well at the sealed distal end of the well, the first fluid being relatively non-conductive;

a second fluid filling a remainder of the well to the opening at the proximal end of the well, the second fluid being relatively conductive, the first and second fluids being immiscible with respect to each other;

a light transmissive plate; and a common electrode on at least a portion of the light transmissive plate, wherein:

the light transmissive plate is located in contact with the flexible seal, in such a manner that the light transmissive plate covers the opening at the proximal end of the well and forms a contact seal with the flexible seal around the opening at the proximal end of the well, and the common electrode contacts the second fluid.

8. The electrowetting cell of claim 7, comprising at least four of the control channel electrodes.

9. The electrowetting cell of claim 7, wherein the flexible seal is a first flat flexible membrane installed to extend over the flexible circuit board and over the second portion of the dielectric layer.

10. The electrowetting cell of claim 7, further comprising a second flexible membrane located in contact with the light transmissive plate, the second flexible membrane having an opening aligned around the opening at the proximal end of the well.

11. The electrowetting cell of claim 10, further comprising:
first and second pieces of a clamp,
the first piece of the claim engaging the light transmissive member in a region outside the well, and
the second piece of the claim engaging the second flexible membrane.

12. The electrowetting cell of claim 11, wherein:
each piece of the clamp has an opening, and
at least a portion of the opening through each piece of the clamp is aligned with the well for passage of light through the electrowetting cell.

13. The electrowetting cell of claim 7, wherein:
the first fluid is a type of oil;
the second fluid comprises water;
the first and second fluids have different indices of refraction;
the dielectric layer is hydrophobic; and
the hydrophobic dielectric layer also covers an interior surface of the sealed distal end of the well.

14. An apparatus comprising the electrowetting cell of claim 7 and an optical/electrical transducer optically coupled to the electrowetting cell to send or receive light through the first and second fluids in the well.

15. A system comprising the apparatus of claim 14 and a processor coupled to the electrowetting cell and the optical/electrical transducer.

16. A plurality of the electrowetting cells of claim 7 mounted together to form a cell array.

17. An apparatus comprising the plurality of electrowetting cells of claim 16 and at least one optical/electrical transducer optically coupled to the electrowetting cells of the array to send or receive light through the first and second fluids in the wells.

18. A system comprising the apparatus of claim 17 and a processor coupled to the electrowetting cells of the array and to the at least one optical/electrical transducer.

* * * * *